(12) United States Patent
Hundt et al.

(10) Patent No.: US 9,426,969 B1
(45) Date of Patent: Aug. 30, 2016

(54) PORTABLE PROTECTIVE SHIELDING DEVICE

(71) Applicants: Vince Gregory Hundt, Coon Valley, WI (US); Peter Austin Bergquist, Westby, WI (US); Guthrie James Knapp, Westby, WI (US)

(72) Inventors: Vince Gregory Hundt, Coon Valley, WI (US); Peter Austin Bergquist, Westby, WI (US); Guthrie James Knapp, Westby, WI (US)

( * ) Notice: Subject to any disclaimer, the term of this patent is extended or adjusted under 35 U.S.C. 154(b) by 0 days.

(21) Appl. No.: 14/207,497

(22) Filed: Mar. 12, 2014

Related U.S. Application Data

(60) Provisional application No. 61/851,790, filed on Mar. 13, 2013.

(51) Int. Cl.
*A01K 13/00* (2006.01)
*E04H 15/06* (2006.01)
*E04H 15/28* (2006.01)

(52) U.S. Cl.
CPC .............. *A01K 13/006* (2013.01); *E04H 15/06* (2013.01); *E04H 15/28* (2013.01)

(58) Field of Classification Search
CPC .............................. E04H 15/28; E04H 15/06
USPC ......... 135/121, 151, 152, 153, 88.01, 88.13, 135/99, 117, 908, 912
See application file for complete search history.

(56) References Cited

U.S. PATENT DOCUMENTS

| 4,000,750 | A | * | 1/1977 | Becher | 135/16 |
| 4,566,475 | A | * | 1/1986 | Wund | 135/99 |
| 6,250,322 | B1 | * | 6/2001 | Porter | 135/98 |
| 6,996,941 | B1 | * | 2/2006 | Maschoff | 52/79.5 |
| 7,044,145 | B2 | * | 5/2006 | Bouchard | 135/98 |

FOREIGN PATENT DOCUMENTS

| DE | 9401638 | * | 4/1994 | E04H 15/28 |
| EP | 632975 | * | 1/1995 | A45B 19/00 |

* cited by examiner

*Primary Examiner* — Noah Hawk
(74) *Attorney, Agent, or Firm* — M. Paul Hendrickson

(57) ABSTRACT

Large number of animals and fowl are shielded against deleterious sun rays and heat by a transportable device equipped with a large sized canopy. The shielding device includes an elevated deploying unit which pivotally hinges canopy supporting arms for deployment to either an open shielding position or a closed position longitudinally aligned for highway transport by a wheeled vehicle.

22 Claims, 26 Drawing Sheets

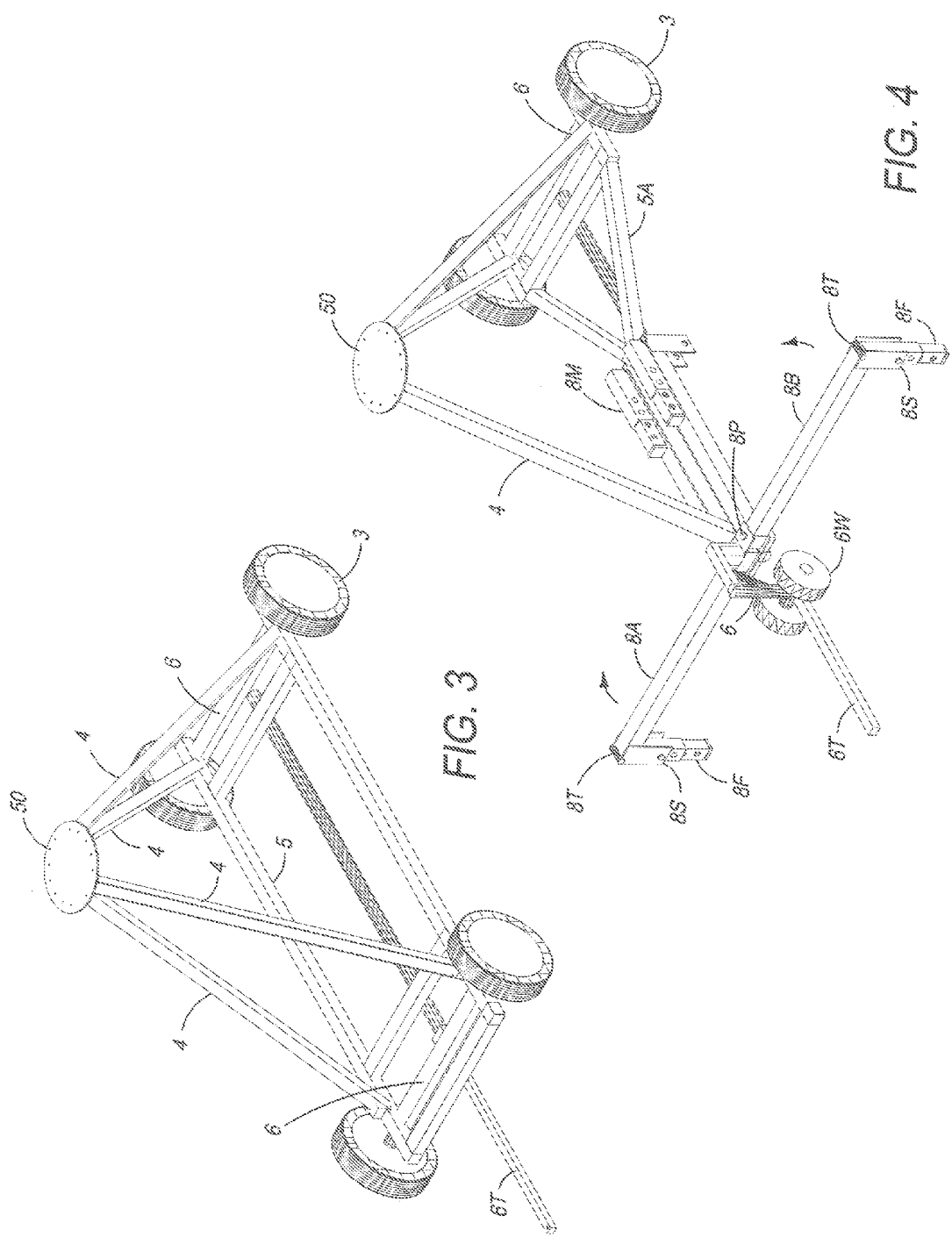

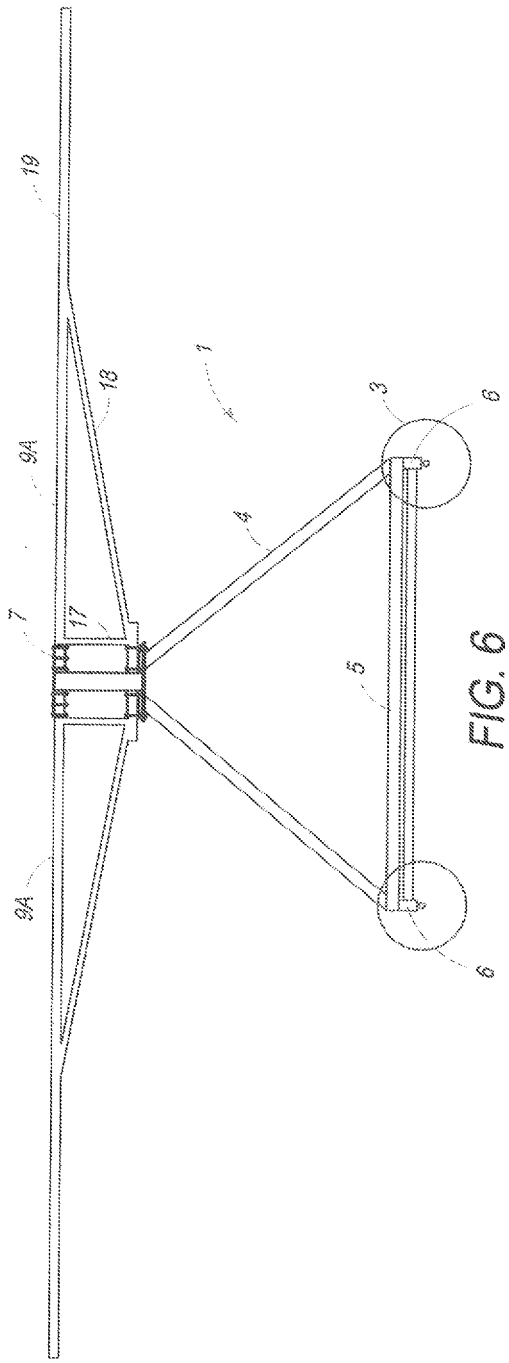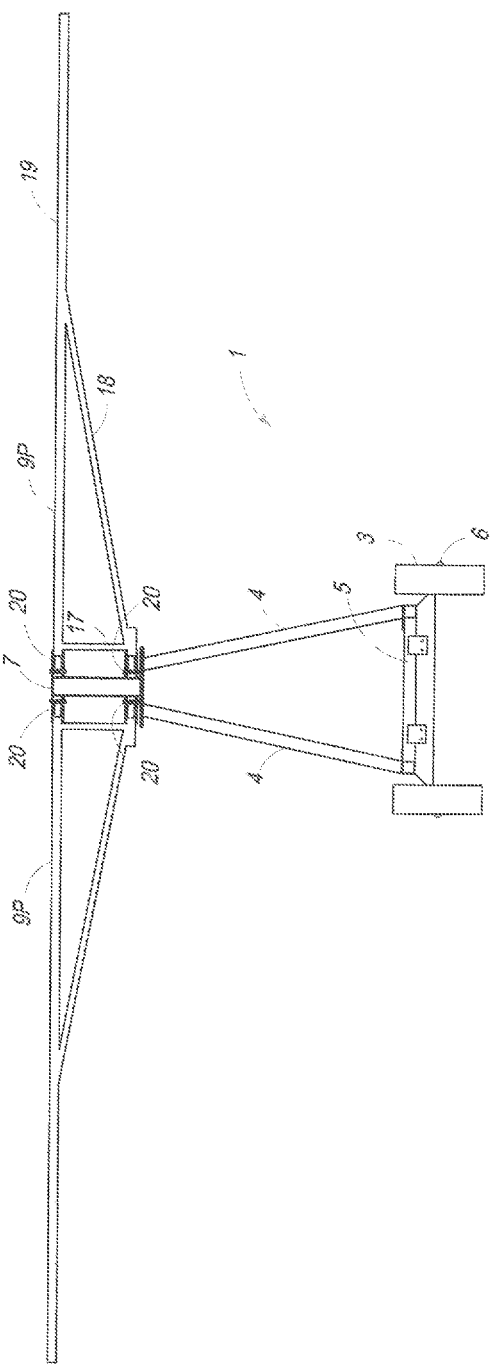

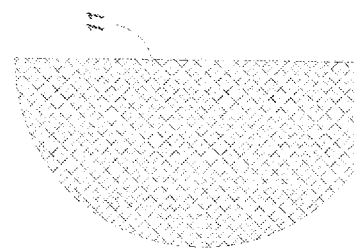
FIG. 21A
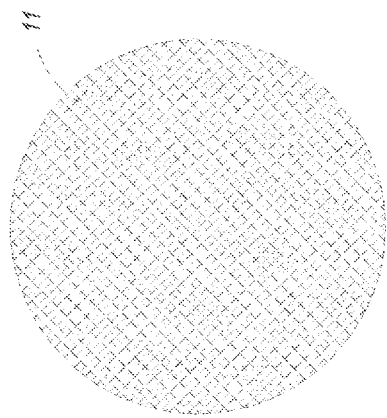
FIG. 21B
FIG. 21D
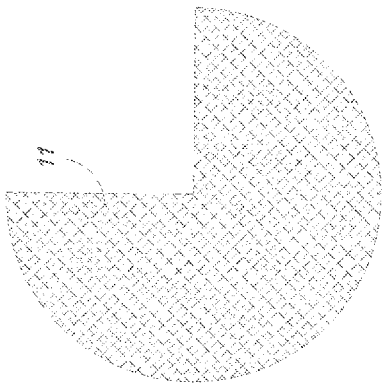
FIG. 21C

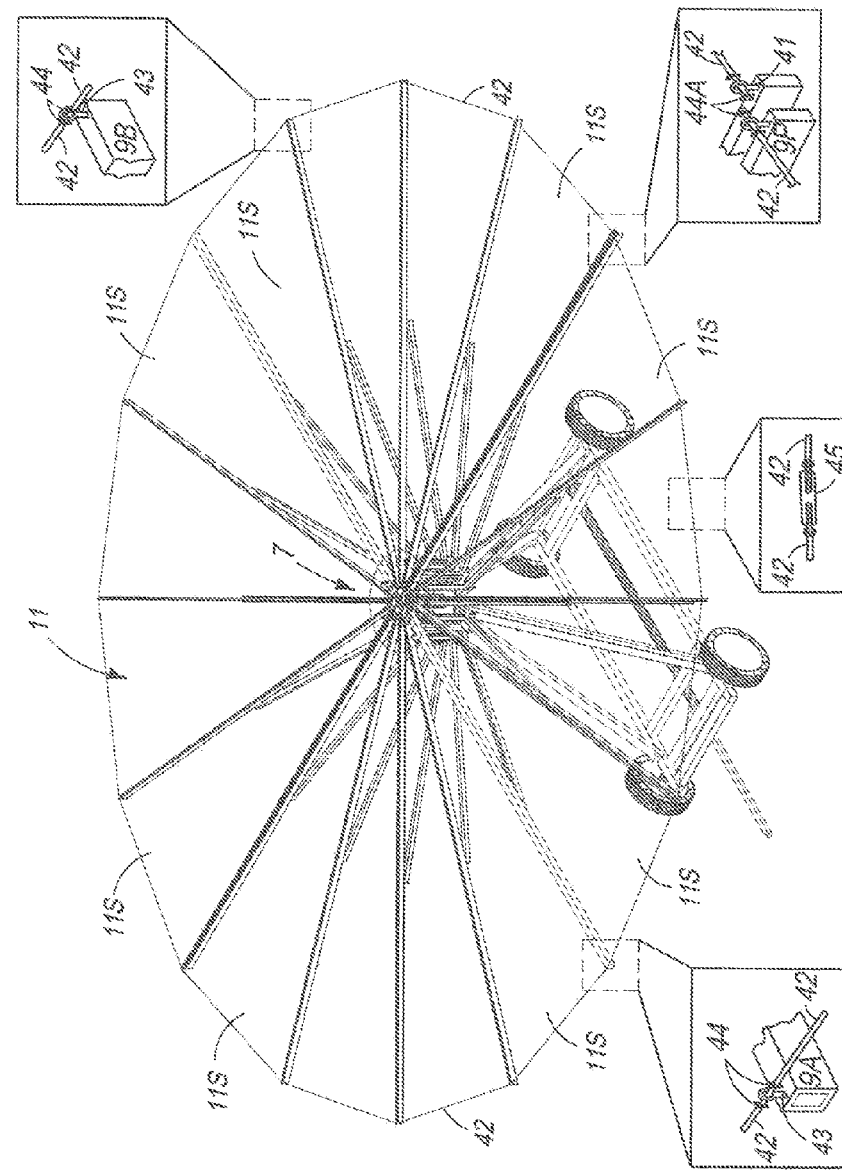

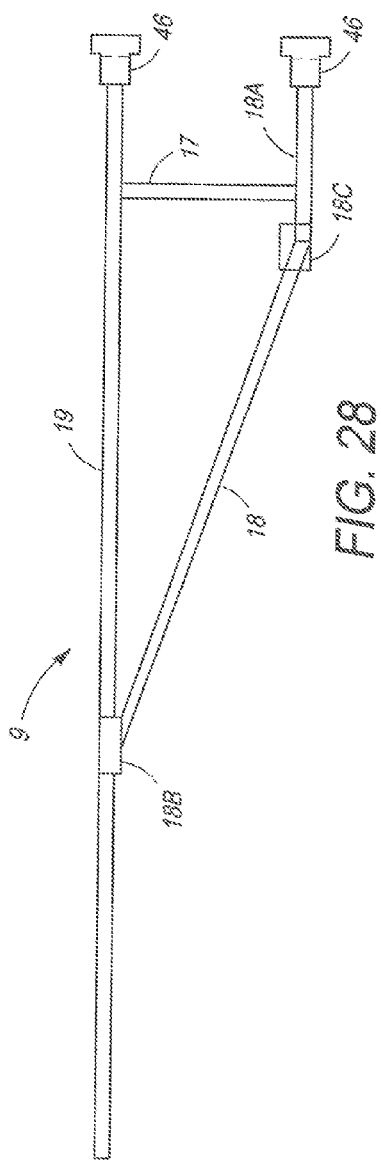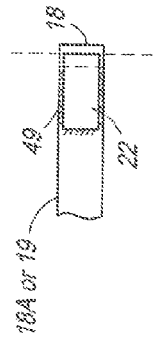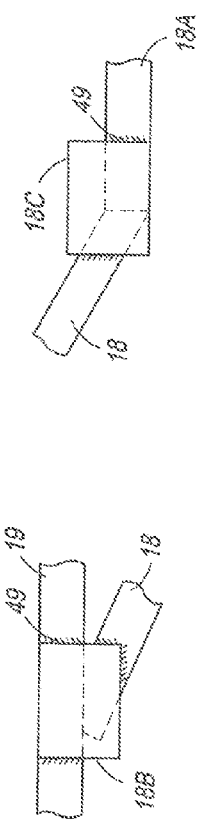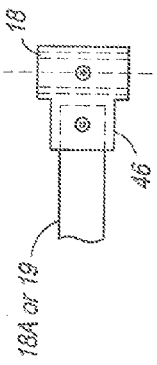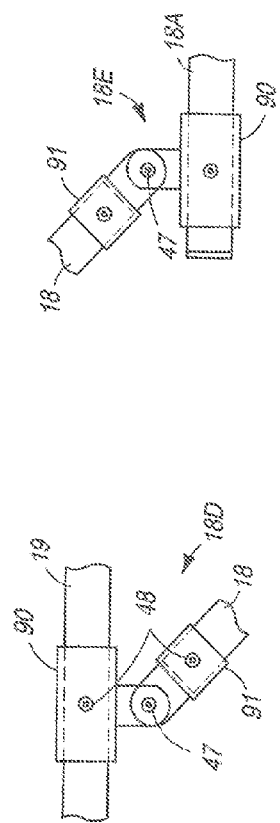
FIG. 28
FIG. 28A
FIG. 28B
FIG. 28C
FIG. 28D
FIG. 28E
FIG. 28F

PORTABLE PROTECTIVE SHIELDING DEVICE

CROSS-REFERENCE TO RELATED APPLICATION

This application claims the benefit of U.S. Provisional Application No. 61/851,790 filed Mar. 13, 2013, and incorporates by reference herein the provisional application in its entirety.

FIELD OF INVENTION

The present invention relates to a shielding device and more particularly a mobile protective shielding device suitable for protectively shielding animals from atmospheric elements and the method of its use.

BACKGROUND OF THE INVENTION

There exists a need to protect animals from harmful atmospheric elements such as rain, hail, sun rays, heat and the like of which the latter two present a particular concern. Exemplary shielding needs exist, in particular, in the pasturing or daytime outdoor lodging of farm animals such as for horses, turkeys, chickens, hogs, dairy and beef cattle, deer, moose, elk, etc. Also unprotected outside activities of humans as well as the more exotic animals such as llamas, alpacas, zoo animals and the like would greatly benefit by an outside portable protective shielding device (PPSD) which could easily be transported to a desired location. Such a device would effectively provide a healthful outside animal sheltering instead of the harmful and costly effects of indoor confinement or the perils of unshielded outside exposure.

A controlled management intensive dairy and beef cattle grazing operation during the hot summer days well illustrates such an existing need. Such managed pasturing often involves grazing cattle for a fixed grazing period and then moving the cattle onto another grazing site. This procedure is necessary to prevent over-passuring, soil nutrient depletions or excesses and grassland erosion due to excessive usage. Under such circumstances sheltering is commonly unavailable leaving most cattle exposed to the harmful effects of sun rays and heat exhaustion which can occasionally be lethal to animals. If animal sheltering is available such shelters typically comprise a small permanent framed structure with a sheltering roof customarily mounted upon skids for transport.

The deleterious effect of unprotected shading in agriculture food production is well documented. Documented studies substantiate the adverse effects which occur when cattle are forced to endure excessive heat and direct sunlight. Dairy cattle exposed to such hot and unshielded conditions exhibit a precipitous drop in milk production. Similarly beef cattle show insufficient weight gain under such adverse conditions.

The need for a portable protective shielding device (PPSD) has become even more demanding with the increasing popularity of grass fed beef and dairy cattle under a farming practice commonly known as "micro-rotational grazing." Such rotational grazing requires the farmer to move foraging livestock herds from one small paddock to another daily. This technique generally results in maintaining superior grazing grasses needed for optimum production while also increasing soil quality, fertility, livestock weight and/or milk production gains with an added benefit of controlling grassland erosion. Paddocks are typically of an acre or less, but may be somewhat larger for pasturing larger herds. Under such rotational practices, permanent sheltering is unfeasible. Rotational grazing under the protection of shade trees is rarely available and the forested area readily deteriorates with use. Under ideal circumstances cattle would be permitted to graze on lushly fresh grass while also having access to water under sheltering conditions against the sun and heat. Where trees exist, cattle tend to deplete fertility from pastures by depositing excess manure while trampling forested areas as well as the grazing areas which leads to further soil erosion and grazing loses.

The importance of a portable protective shielding device (PPSD) as provided by the present invention is exemplified by the many advantageous benefits afforded in agricultural milk and meat production such as:

1. Providing a relatively inexpensive shade source for relatively large herds which results in significantly increased meat and milk production by reducing heat stress from sun radiation;
2. Enhancing soil fertility by timely repositioning of the PPDS to provide needed soil nutrients at the appropriate levels in a schematic rotation;
3. Reducing run off and water pollution by repositioning the PPSD at a safe distance from vulnerable watersheds without creating the deleterious effects of cattle runs;
4. Protecting tree and grasslands from damage caused by excessive trampling by livestock;
5. Providing an effective feeding and watering station when the PPSD is so equipped;
6. Providing effective fly control by equipping the PPSD with a fly control system;
7. Providing an aesthetically pleasing feature to a rural landscape;
8. Providing a more healthful animal environment;
9. Affording portable shielding protection to large numbers of animal herds, crowds, flocks, etc.;
10. Meeting the sheltering standards for organic foods and;
11. Providing a protective animal shielding device which may easily deployed when needed and collapsed into a highway transportable device for deployment at another site.

A properly designed PPSD provides mobility and flexibility to the animal shading device. Notwithstanding its size, the PPSD can be moved from farm to farm on public roads at highway speeds. This is accomplished by engineering the PPSD so as to fold into a compact transport mode for safe wheeled transport. Upon deployment at a desired pasture location, the PPSD may be equipped to easily provide 1,000 square feet or more of shaded area coverage. A PPSD meeting the 53 foot highway trailer requirement affords about 2,226 square feet shading. Simply by adding an additional 10 feet of telescoping radial arms in support of the protective canopy the available shade coverage increases to about 4,223 square feet. Accordingly it may be seen that the PPSD can be tailored made to suit the specific needs for any given operation. Transport within the pasture or highway can be done quickly and easily with any vehicle such as a small ATV, skid steer, tractor, automobile, truck, fork lift, etc. as well as by animal. The PPSD longitudinally collapses into a compact form for roadway transport. The PPSD may be designed to protect both the device and the animals against injury and damage. The 360° degree access afforded by the device allows cattle to move freely into and within the PPSD with minimal obstruction while providing optimum venting. In case of severe weather warnings, the PPSD may be expeditiously collapsed into a stowable longitudinal form for transport or on-site stowing to protect the device from wind and any other damage sources. Positioning the PPSD into the stowable transportable position (frequently referred to as the "closed position") or a protective shielding position (referred to as the "open position") may be effectuated manually, mechanically, remotely or automatically such as through the use of cranks, hydraulics, electric servo motors, aerodynamics, spring activated systems, etc.

The PPSD (referred herein as the device) is designed to be uniquely comfortable for both man and beast. Upon the canopy deployment the device imparts heat releasing attributes. The preamble horizontal surface of the deployed canopy prevents heat entrapment. The substantially horizontal alignment of the porous canopy surface and its open structure minimizes entrapped stagnated air or the effects of wind currents to catch or move the PPSD. Illustrative of a particularly suitable canopy is the use of an 80% polyethylene knit black shade cloth which prevents sun ray penetration but allows the shade cloth to breath from beneath the canopy which in turn allows hot air to escape confinement. The use of a knit black fabric functions as a heat absorber to permit a more rapid upwardly dissipation of the heated stagnated air beneath the canopy into the atmosphere above the canopy while allowing cooler convection currents to gently and uniformly breeze from outside the canopy to within the canopy to create a desirable cooling effect. These features also serve to reduce animal eye strain reflection and insect or fly gathering within the protective area.

Shielding of humans is also an important factor in order to protect an outdoor worker against the harmful effects of sun rays and heat exhaustion. For outdoor gatherings, tents are commonly used in group gatherings of twenty or more people. Unfortunately, such tents typically need to be rented while also necessitating substantial time and effort to install, disassemble and transport typically by a truck or trailer. Conventional tents also typically create an undesirable tenting of heat which arises due to a failure to effectively dissipate heat entrapped beneath and within the tent. This provides an uncomfortable and unhealthful environment especially during the hot and humid summer months. A transportable protective shielding device which would allow for quick assembly and disassembly for the user while also providing a more complete protection against harmful sun rays and a superior dissipation of heat from the shielding structure would fulfill a long existing need.

Another example of circumstances wherein a portable protective shielding device would provide significant advantages over current practices pertains to the ability to provide a mobile protective shield for harvesting workers. There exists a need to protect workers from the sun (e.g. sun and heat stroke, sunburns, dehydration, etc.) as commonly arises in horticultural enterprises such as weeding, detasseling, transplanting, harvesting fruits and vegetables as well as any other outdoor horticulture activity necessitating outdoor worker protection from sun and heat. There further exists a need to protect harvesting workers when workers are engaged in harvesting produce from rowed crops. There exists a further need for a PPSD which may be transported from field to field or from one farm to another farm over public roadways, and then readily assembled or disassembled from its shielding assembly position while also permitting the necessary in-row portability and worker shielding in horticulture and other work related mobile outdoor activities.

The PPSD of this invention fulfills all of these long felt needs. The PPSD herein provides protection from the elements. The PPSD herein effectively protects animals, humans, fowl, etc. from sun and heat as well as other elements such as rain, hail and the like. The PPSD may also be used as a temporary tent for outdoor events, parties, celebrations, military drills and any other type of desired outdoor gathering as well as providing emergency protection for civil authorities such as for natural disasters.

The present invention meets these unique needs by providing a portable protective shielding device (PPSD) which may be readily collapsed for transport and readily assembled or deployed about a circular axis into an arcuate shielding position at a desired shielding site. Accordingly it may be seen that the PPSD of this invention thus fulfills a host of long felt needs.

BRIEF DESCRIPTION OF THE DRAWINGS

FIG. 3 depicts the device shown in FIG. 1 depicting a mount for the deploying unit.

FIG. 4 is an isometric top side view of a different wheeled undercarriage shown in FIG. 3 equipped with a ground stabilizing unit.

FIG. 6 is a cross-half sectional side view depicting the device shown in FIG. 1 equipped with the deploying unit of FIG. 5A and the depicted supportive arms for the protective canopy.

FIG. 7 is a cross-half sectional frontal view of device shown in FIG. 6.

FIG. 10A is an enlarged view of a wheeled tracking rail of the attachment shown in FIG. 10.

FIGS. 21A, 21B, 21C & 21D are top views depicting alternative positioning of the canopy ranging from a partial opening to fully opened canopy.

FIG. 27 is an isometric top view of the device with the phantom rectangular sections showing enlarged perspective views of FIGS. 27A, 27B, 27C & 27D which show the peripheral canopy cable and associated operational components used to deploy and retract the movable arms and attached canopy.

FIG. 28 depicts a side view of a movable or stationary supportive arm with FIGS. 28A, 28B, 28C, 28D, 28E & 28F showing enlarged side views of designated sections of FIG. 28.

DETAILED DESCRIPTION OF THE INVENTION

Figure 1:
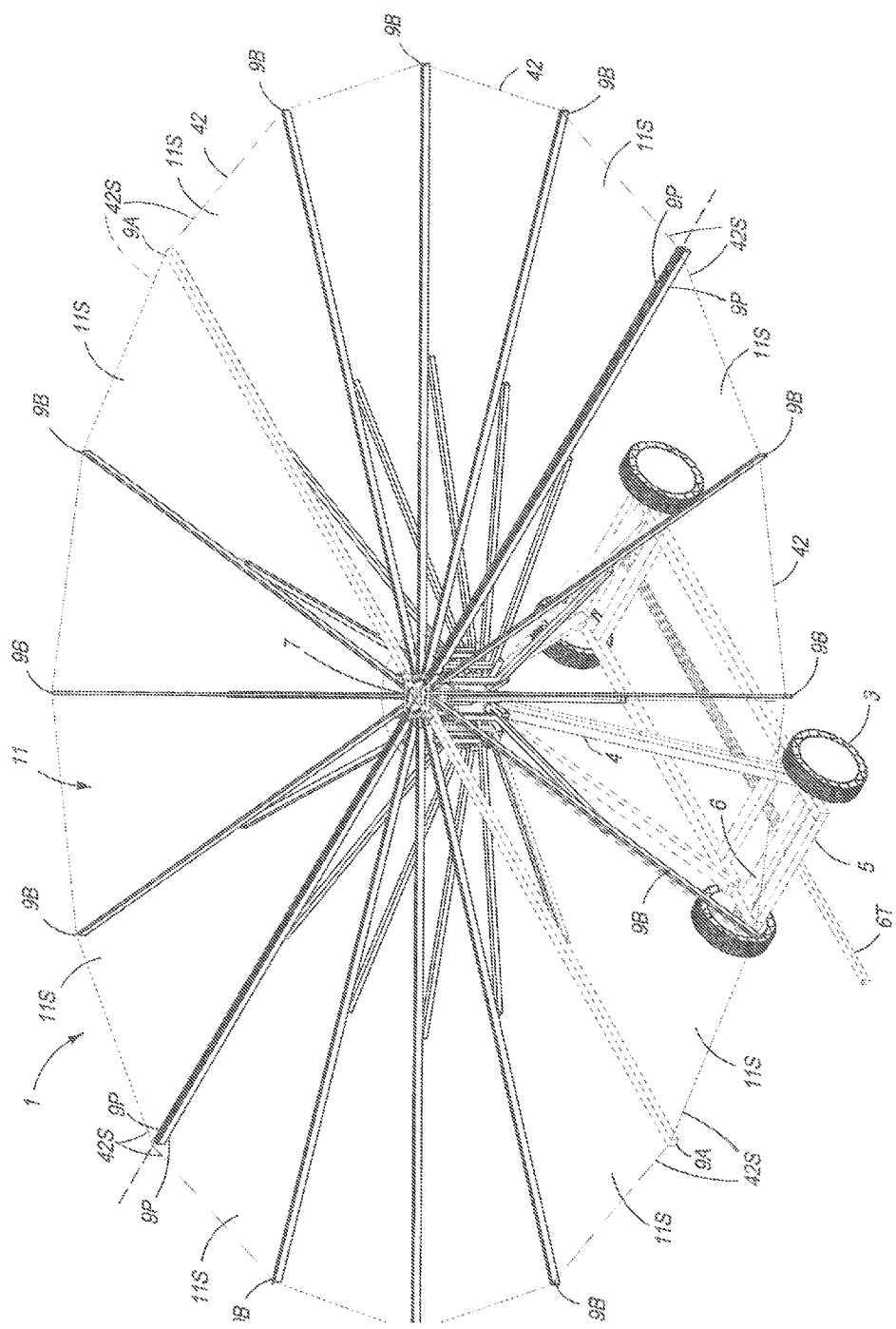
FIG. 1 depicts a top isometric view of the portable protective shielding device of this invention with the normal opaque characteristic of the canopy being transparent to better depict the hidden parts.

Pursuant to the present invention there is provided a portable protective outdoor shielding device 1 for protecting animals from the harmful effects of excessive heat and sunlight with the device comprising:

A.) an undercarriage 3 adapted for wheeled transport of the device 1;

B.) an arm deploying unit 7 mounted to the undercarriage 3 at a sufficient elevational level to allow protective shielding of the animals desired to be shielded thereby;

C.) a plurality of movable horizontally aligned arms 9B positioned for movement about the deploying unit 7, with said movable arms 9B being radially mounted to the arm deploying unit 7 so as to radially fan outwardly about the deploying unit 7 when the arms are positioned in an open position and retract so as to be in longitudinal alignment with the direction of transport when placed in a closed position;

D.) at least one retaining member 15 for retaining the arms 9 placed in the open position and retaining the arms 9 when placed in the closed position and;

E.) a shielding canopy 11 movable supported by said arms 9 and containing at least one separating sectional break 11S separating at least one canopy section from another canopy section so as to permit independent movement of each section when carried by said arms 9 with said sectional break 11S permitting the movable arms 9B to move about the arm deploying unit 7 when placing the arms 9 in longitudinal alignment for transport in the closed position and move about the arm deploying unit 7 to the open position so as to permit the device 1 to provide protective shielding for animals sheltered by the canopy 11 at the open position.

With a general reference to the drawings, it may be observed that FIGS. 1-4, 7-9 19-20 and 24-27 disclose the device 1 which generally includes the wheeled undercarriage 3, at least one stationary 9A, movable arms 9B (inclusive of movable drive arms 9P) supported by the arm deploying unit 7, a protective canopy 11 deployable to an open protective position or withdrawn to a closed position by said movable arms 9B. If desired, outrigging attachments (prefixed by 8) may be used to stabilize the device 1 at its deployment site.

The embodiments of the arms deploying unit 7 are depicted in FIGS. 5, 5A, 13, 15-16 and 22-23 showing several views of the operational relationship between the arms 9 and deploying unit 7 when positioning the arms 9 in an open and deploying protective canopy positioning and when retracted to a closed transport position.

The other Figures are generally directed towards the deployment relationship between the stationary arms 9A, the hinged arms 9B and the hinged drive arms 9P which serve to deploy the movable arms 9B about the arm deploying unit 7. FIGS. 2, 10, 10A, 11, 24-26 and 27A-27D disclose a deployment drive mechanism 13 and its components which may be used effectively to draw the pulling arms 9P together when deploying the canopy sections 11S to the protective open position.

With further reference to the accompanying depictions of the present invention herein and the disclosure of our provisional application No. 61/851,790, (which is incorporated by reference in its entirety), the present invention provides a retractable portable protective shielding device (generally referenced as 1) which is particularly useful in shielding a wide range of creatures (including humans and fowl) from the harmful environmental effects and particularly the harmful effects of direct and indirect solar radiation. The device 1 is especially adapted to be transported by a wheeled vehicle (generally referenced as 3) which may be incorporated into and made an integral part of the device 1 or by any other adaptation which permits the device 1 to be transported by a vehicle 3. The transportable features of the PPSD 1 may embrace a self-propelled device 1 (e.g. a motorized vehicular unit) or by adaptation to a wheeled carriage 3 or any other means which permit the device 1 to be transported manually or by a motorized vehicle 3. The device 1 includes a transportable position and a protective shielding position. In general, landed vehicles adapted for transport utilizing a wheeled mechanism to effectuate movement even though such movement may be a track driven by a wheeled gear drive system may be used to transport the device 1.

The depicted device 1 in a transportable state as shown in the Figures includes a wheeled undercarriage 3 (e.g. see FIGS. 1-4, 6-7, 19-20 and 24-27) for transporting the device 1 from one shielding site to another shielding site. The depicted device 1 may appropriately utilizes an external transport power source or may include a self-powered vehicular source to move or transport the PPSD unit 1. Alternatively, the device 1 may be adapted for transport by equipping the device 1 with a frame 5 adapted for carriage by a powered vehicle equipped with a lift (e.g. skid steer, fork lift, tractor equipped with a front or rear end loader, etc.) or otherwise adapted to other means to provide transport for the device 1.

The depicted shielding embodiments include a transportable support frame or undercarriage 5 typically adapted for vehicular transport 3. The device 1 includes vertically extending structure 4 (e.g. mast, post, a supportive brace, etc.) which provide the necessary elevation above ground level to place the deploying unit 7 at an effective shielding position. As may be observed from FIGS. 3 and 4, the apex of the elevating structural frame 4 may effectively serve as a supportive elevational mount for the mounting plate 50 which in turn serves as a mount 50 for the deploying unit 7. The mounted deploying unit 7 is equipped with outwardly extending arms 9 which radially deploy or retract about the deploying unit 7. In a retracted or transport position (e.g. see FIGS. 11 and 12), the arms 9 are placed in a longitudinal alignment with the vehicular transport direction. The deploying unit 7 supports a plurality of the canopy support arms 9 which may be provided in any suitable form (e.g. as spokes, beams, rails, horizontal supports, ribs, etc.) suitably hinged or movable about the arm deploying unit 7 which allows the movable arms 9B to be radially positioned about the arm deploying unit 7 in either an open or a closed position. By pivotally moving the movable arms 9B about the central axis provided by the deploying unit 7 (e.g. see FIGS. 11-16), the movable arms 9B may be positioned so as to radiate outwardly about the central axial support provided by the deploying unit 7 in support of the protective canopy 11 when the device 1 is deployed to an open position. The arm deploying unit 7 also includes one or more stationary arms 9A anchored to the deploying unit 7 which serve as an anchoring point for the moving movable arms 9B and supported canopy sections 11S about the deploying unit 7 or retract the canopy sections 11S onto one or more stationary arm 9A.

When the device 1 is positioned in an open shielding position as depicted in FIGS. 1-2, 12-16, 19-20, and 26-27, the arms 9 with the attached and deployed canopy 11 provide an arcuate area of shade open to convection currents about its entire peripheral margins while also allowing for the expelling undesirable pent-up heat therewithin to provide relief from solar radiation and heat. When the movable arms 9B retract about the deploying unit 7 to a closed position (e.g. see FIGS. 11 and 13-15), the retracting arms 9B retract onto a longitudinal axis aligned with the direction of transport used to transport the device 1. This unique feature affords an effective transport of the device 1 upon public or private roadways. The protective and sectionalized flexible shielding canopy sections 11S are operably attached to support arms 9 which permits the canopy sections 11S to be positioned either in a fully opened or partial protective canopy position or at a closed transport position by retracting the radial extending arms 9B about the deploying unit 7 to the longitudinal aligned closed position.

Figure 10:
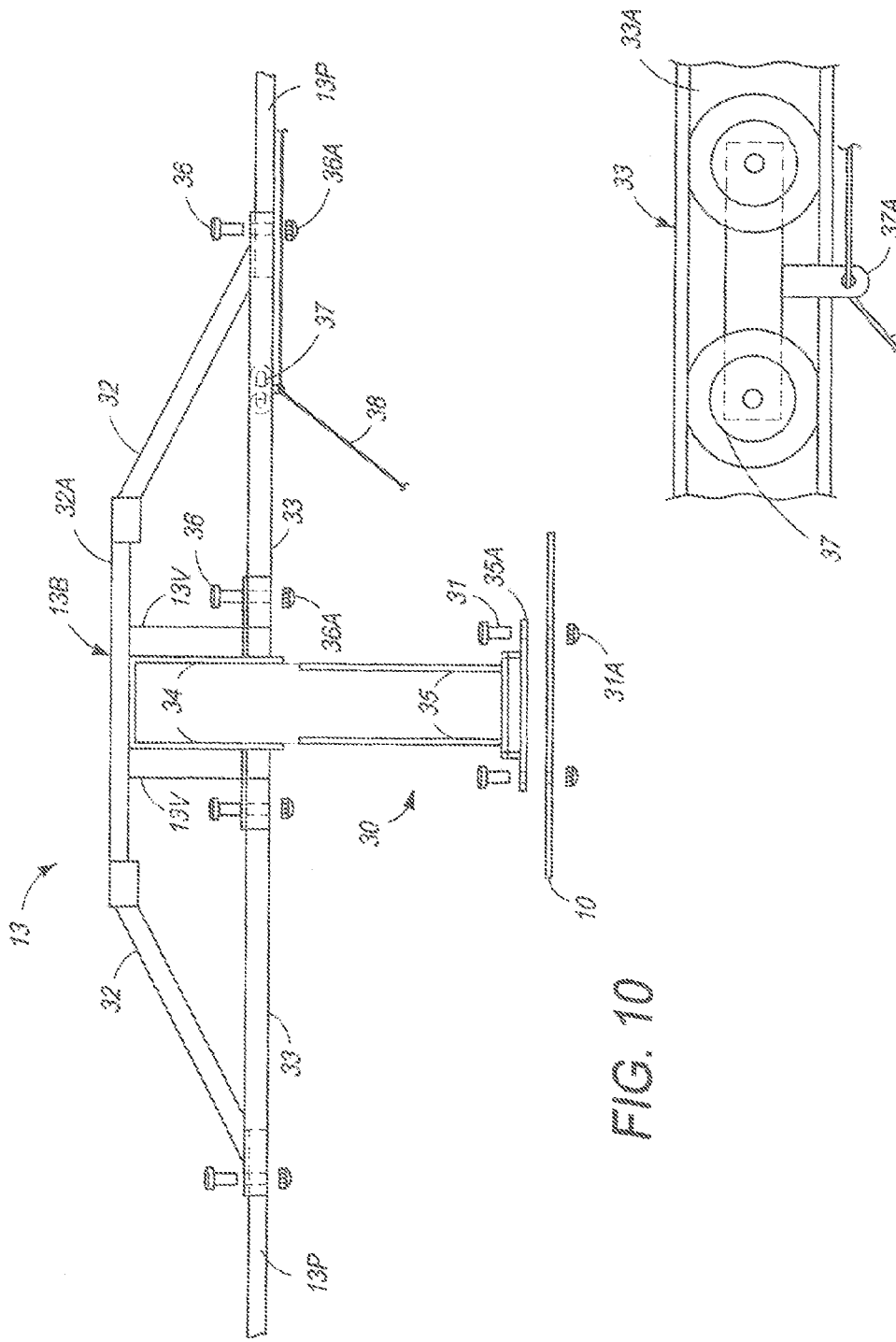
FIG. 10 is a cross-sectional view of a deploying drive mechanism attachment used to mechanically deploy the movable supportive arms to a desired position.
Figure 11:
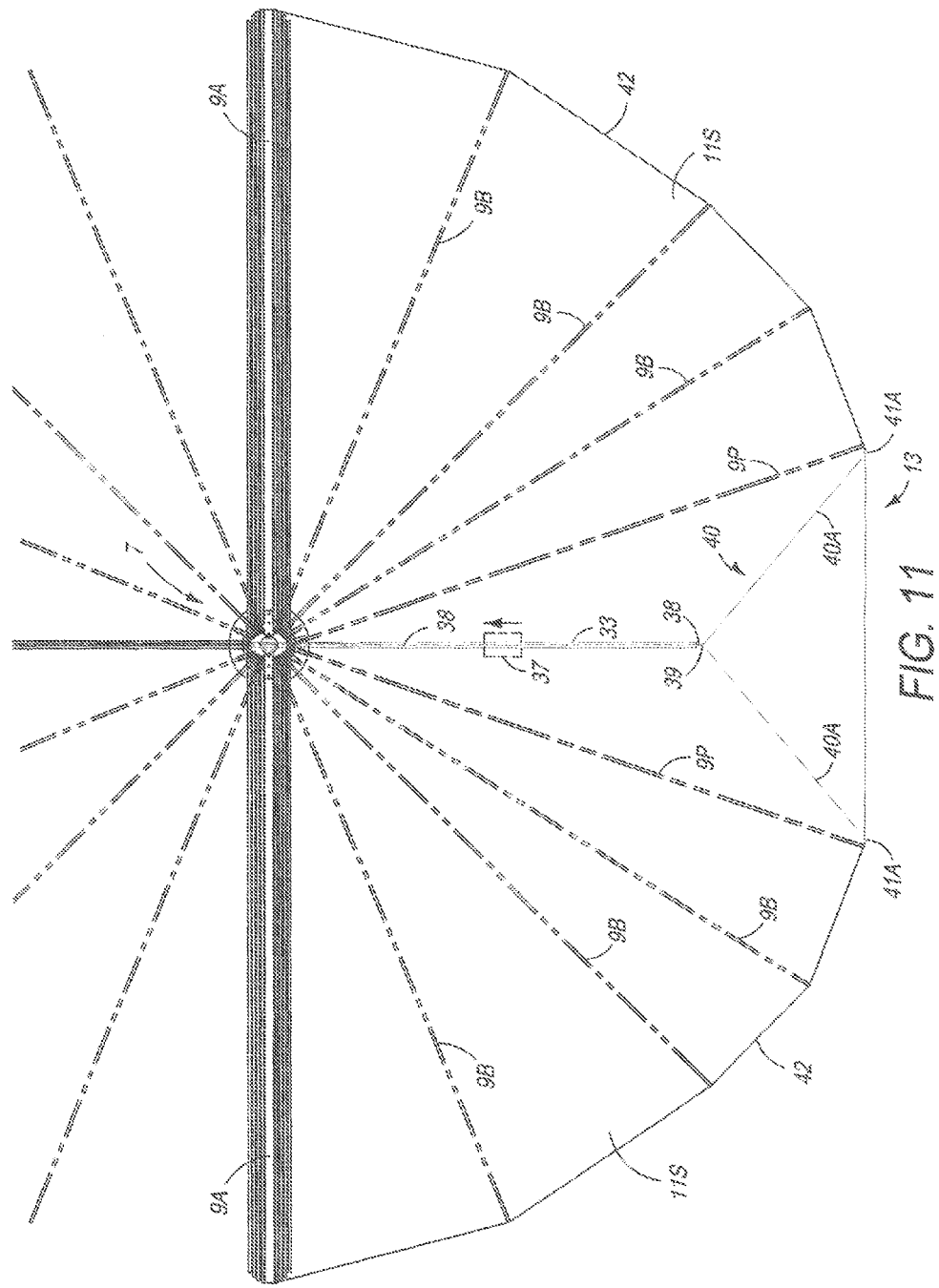
FIG. 11 is a top view depicting in part the operational use of the deploying drive mechanism used to deploy and withdraw the radial arms with the solid lines showing the movable arms at the retracted position and a pulling system for drawing the depicted phantom line arms towards the open canopy position.
Figure 12:
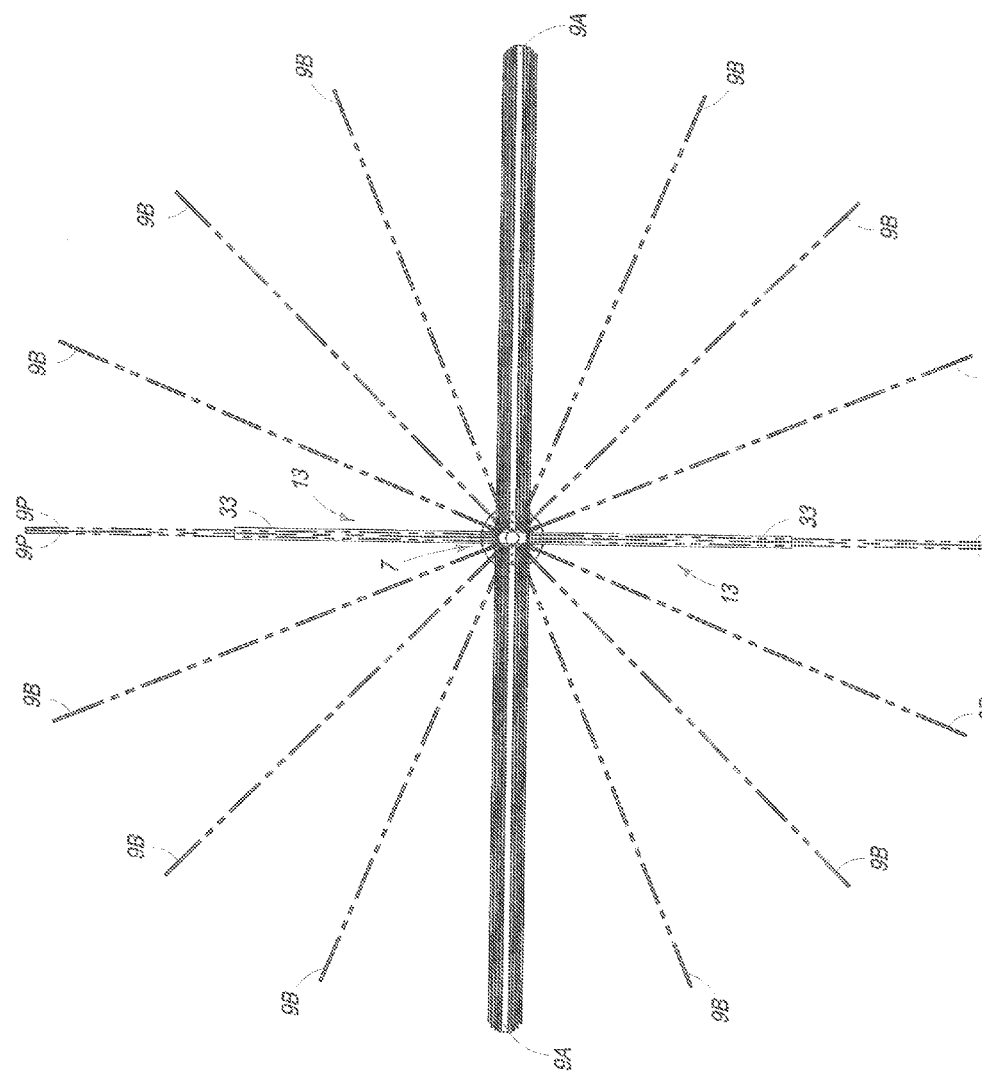
FIG. 12 is a top view of the stationary supportive arms and deploying unit of FIG. 1 with the phantom lines depicting the movable support arms deployed to an open position while the solid lines depict the movable support arms in the closed transport position.
Figure 14:
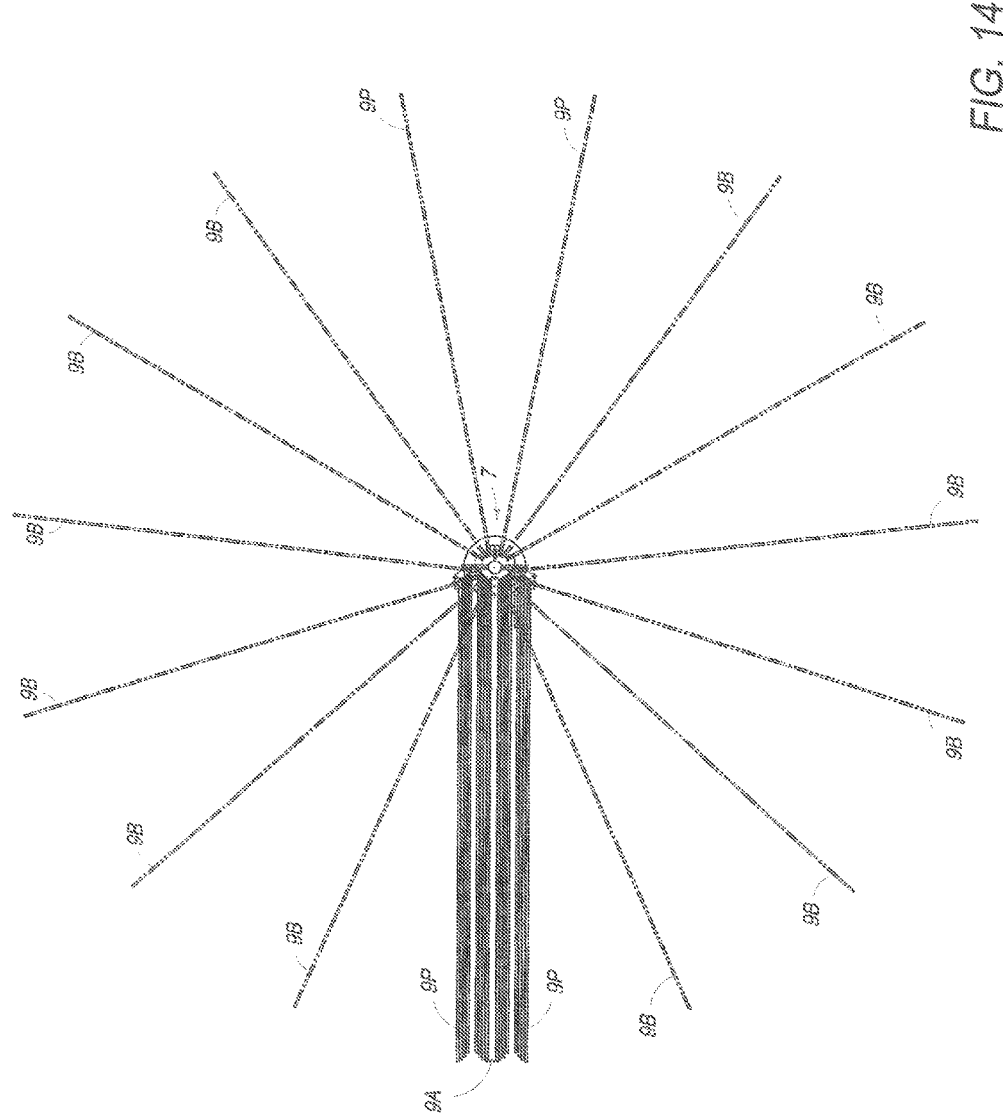
FIG. 14 represents an alternative top view of the device shown in FIG. 1 equipped with a deploying unit which aligns a support arm on one side of the deploying unit in contrast to the pairing of supportive arms on opposite sides of the deploying unit as depicted in FIG. 12.
Figure 15:
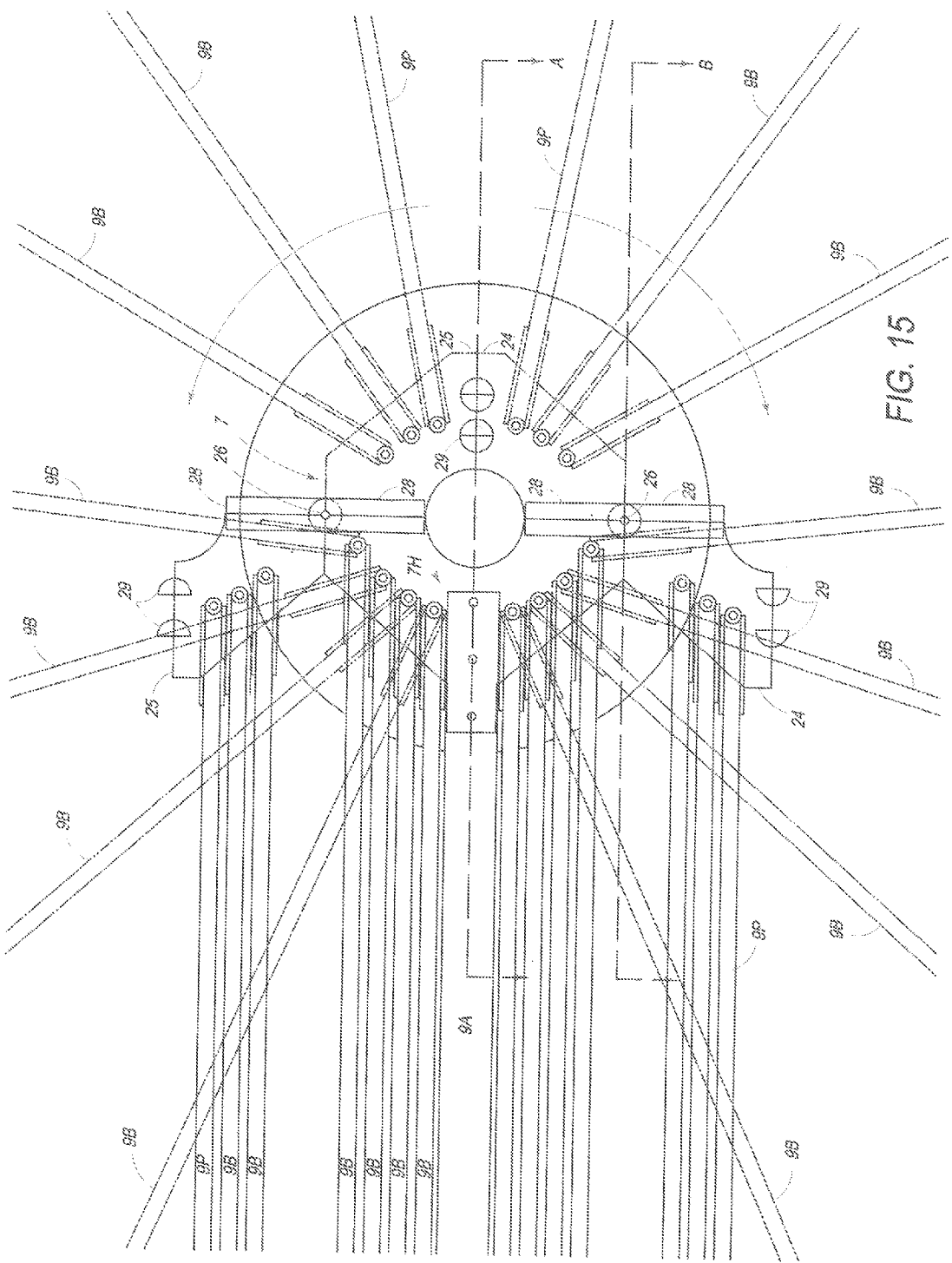
FIG. 15 is an enlarged top view of FIG. 14 with cross-sectional views taken along lines A-A and B-B being respectively depicted in FIGS. 17 and 18.

The device 1 as illustrated by FIGS. 2, 10, 10A-11, 24-26 and 27A-D may be equipped with a drive mechanism 13 operably connected to arms 9 (or deploying unit 7) so to move to the hinged or movable arms 9B onto a desired radiating open shielding position or close the movable arms 9B onto the stationary arm or arms 9A along a forward and/or aft longitudinal alignment in a closed transport position as illustrated by FIGS. 12 and 14. The device 1 suitable incorporates stopping members 15 for retaining the movable arms 9B at an appropriate angular or radial position when placed in the open position and one or more stops 15 to retain the movable arms 9B in a closed transport position. Retaining stops 15 binding the appropriate arms 9 together (e.g. ropes, straps, etc.) or other means such as winch equipped with ratcheted pawls etc. may effectuate this purpose.

The device 1 operationally includes radially arms 9 and a deploying unit 7 which effectively serves as a pivotal mount or hinge for the arms 9 mounted thereto. The hinged movable arms 9B move about the deploying unit 7 carrying the attached canopy 11 and its canopy sections 11S to the desired protective shielding position. As explained later in greater detail, the device 1 includes one or more stationary arms 9A and a plurality of hinged or pivotally mounted or radially movable arms 9B which may be movably positioned about the deploying unit 7. The arms 9 and canopy 11 may be readily retracted onto the transportable longitudinally aligned arms transport form or deployed to an open position by the arm deploying unit 7.

The canopy 11 is supported, carried and appropriately positioned by the moving arms 9B about the deploying unit 7 so as to radially project outwardly at predetermined radial positions when the canopy 11 and the arms 9B are deployed to the open position. The arms 9 are appropriately spaced at a sufficient distance apart so as to provide the desired or necessary structural support for the canopy 11 when placed in the open position and desirably evenly retain a level canopy 11. When the movable arms 9B retract to a closed position longitudinally aligned with stationary arm 9A, the canopy 11 remains evenly distributed amongst the closed arms 9. The various positioning of the arms 9 in a single and a dual combination of stationary arms 9A is depicted by the FIGS. 11-16. The solid lines depict the arms 9 positioned in the closed position whereas the phantom lines in FIGS. 11-14 reflect the arms 9 when positioned in the open position.

FIGS. 27A-27D depict how the appropriate spacing between movable arms 9B may be maintained. Although the 27 series of Figures depict clips (44 and terminating clips 44A) bracketing eyelets 43 and turn buckles 45 positioned along the peripheral marginly of the canopy rope 42 and rope sections 42S there exist other means for positioning the movable arms 9B at the appropriate open and closed position such as equipping the deploying unit 7 or rope 42 and rope sections 42S with latches, stops, pins, etc. which serve the same function to produce a similar effect may also be used for this purpose. An angular positioning between each adjacent radial arm 9 when deployed to the open position will typically range from about a 15 to about 30 angular degrees which adequately provides support under normal conditions for most canopies 11 except very large canopies. The arms 9 in the accompanying drawings are illustratively depicted as having an angular arc of about 22.5 degrees between each of the adjacent arms 9. The number of desired arms 9 and the angular positioning between the arms 9 will accordingly depend to a certain degree upon the canopy 11 size and the desired tautness of the canopy 11 stretched or bridging therebetween. For example, arms 9 measuring 16 feet in length (representative of the depicted drawing) an angular spacing of about 22.5 degrees between adjacent arms 9 will generally provide adequate undercarriage support for the canopy 11 so as to maintain a substantially horizontally level canopy surface when drawn to the open position. The number of movable arms 9B and angularly distance between each arm 9 will desirably be sufficient to substantially retain the canopy to tautly onto the arms 9.

The number of radially extending arms 9 needed to effectively support the canopy 11 may accordingly vary with the canopy size. As the canopy 11 size increases by extending the arm 9 length, the required number of support arms 9 may illustratively be increased in the absence of some other supportive cross-bracing or support between adjacent arms 9 to support the canopy 11 bridging between the movable arms 9. Collapsible bracing between arms 9 such as flexible straps, linked chains, ropes, etc. (not shown) may also be illustratively utilized to level and support the canopy 11 between longer arms 9 along the outer perimeter margins. Similarly as the arm length increases, additional truss, hinging and other arm supports may also be correspondly needed to support the more lengthy arms 9.

The length of the arms 9 will determine the shade coverage. As the arm 9 length increases, the necessary structural under-pinning (including the arms 9 and under carriage 3 & 5) to adequately stabilize the PPSD 1 may need to be addressed in order to stabilize the deployed and the transport of the device 1. Using a conventional extendable farm hay wagon (e.g. see FIG. 1) as a transport carriage 3, the PPSD 1 will typically provide a grounded support to adequately support and stabilize a 1,000-2,000 square foot canopy 11 for transport and deployment. Since there exists an abundance of conventional farm wagons with extendable or telescoping main beams, these farm wagons afford a particularly effective and cheap transport source for the device 1. Conventional farm wagons may accordingly be effectively and readily adapted for use herein as a transport vehicle when towed by a vehicular power source. Simply by mounting the supportive frame 5 including the elevating legs 4 and a deploying unit mount 50 (e.g. see FIG. 31), the PPSD 1 (including the deploying unit 7) may be mounted to a suitable transport 3 (e.g. see FIGS. 1-4, 6-7, 19-20 and 24-27), which allows the device 1 to be hitched or otherwise secured to any suitable wheeled power source (e.g. ATV, car, truck, tractor, skid steer, horse, etc.) for transport to a desired site.

The depicted two-axle wheeled vehicle 3 depicted by FIGS. 1-3, 6-7 and 27 (a conventional farm wagon) includes a top mounting plate 50 anchored (welded or bolted) to a plurality (4) of slanted supportive legs 4, a four wheel and two axle assembly 6 equipped with a tow-bar 6T that swings up or down about a hinged axis to allow hitching to a towing vehicle 3. The supportive base 5 is shown as part of the wagon assembly 3 firmly attached to the wheel and axle assembly 3 with the vertical support legs 4 being rigidly attached to the base support 5. The mounting plate 50 is securely anchored (e.g. welded) to the terminating ends of the vertical support legs 4.

The device 1 may be equipped with as many wheels and axles as may be desired or required for its effective transport. The larger devices 1 may require more attention to its stabilizing undercarriage 5 than the smaller sized devices 1. The one-axle transport option as depicted by FIGS. 4, 19-20 and 24-26 represents an effective alternative transport to the two-axle transport structure 3 of FIGS. 1-3, 6-7 and 27. The single axle carriage 3 provides better handling at higher tow speeds especially when used for long distance tows. However, as depicted in FIG. 4, collapsible outriggers (prefixed by 8) useful in stabilizing the deployed device 1 may be required to compensate for its undercarriage 5 and single axle transport. The retractable outriggers 8 depicted by FIG. 4 are designed to stabilize the deployed device 1 by matching the stabilizing outriggers 8 with the terrain. The depicted outriggers 8 include a pair of outrigging stabilizing arms 8A & 8B. Each stabilizing arm 8A & 8B pivots about a pivotal mount 8P to allow for positioning at a desired stabilizing ground position. The stabilizing arms 8A & 8B are also adapted to nest backwardly onto the supportive frame 5A when placed in a transport position. Stabilizing arm 8A is hinged so that it pivots 180° degrees horizontally about its pivotal mount 8P and appropriately equipped with a latch 8M such as a hitch pin or spring pin, etc. to latch arm 8A at its desired deployed position. Both of the adjustable outrigging stabilizing arm 8A & 8B are fitted with adjustable foots 8F shown as telescoping foots 8F with set pins 8S setting each foot 8F at the desired elevational positioning. In addition telescoping foots 8F pivot 270 degrees vertically about their pivotal mount 8T. The foots 8F may, if desired, be hydraulically, motorized or otherwise mechanically driven. The outrigging 8 is attached to base frame 5A of the device 1 which may also be elevated to the desired elevation by manually pinning a crank or hydraulic jack. A forwardly trailering or retracting wheel 6W swivels freely (in a horizontal plane), enabling the device 1 to be towed with a smaller vehicle unable to support a heavy tongue weight. The depicted one axle trailer 3 is particularly well suited for long distant, high speed transport with a vehicle equipped to transport the device 1. Conventional trailer jacks (not shown) pivotally mountable to the trailer tongue may also be used to facilitate hitching and unhitching of the wheel and axle assembly 6.

Figure 16:
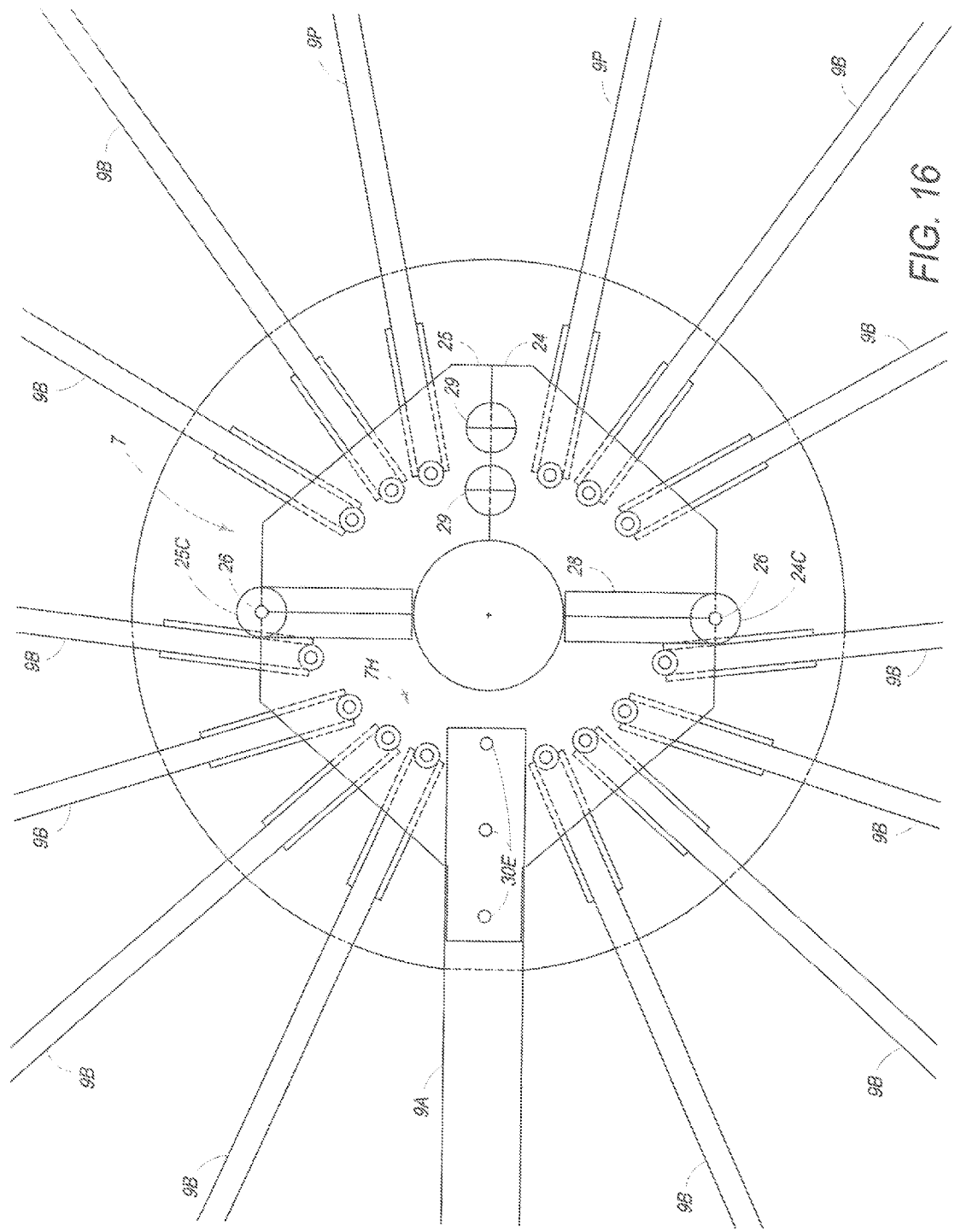
FIG. 16 is a top view of FIG. 15 showing the deploying unit and arms positioned in an open position.
Figure 17:
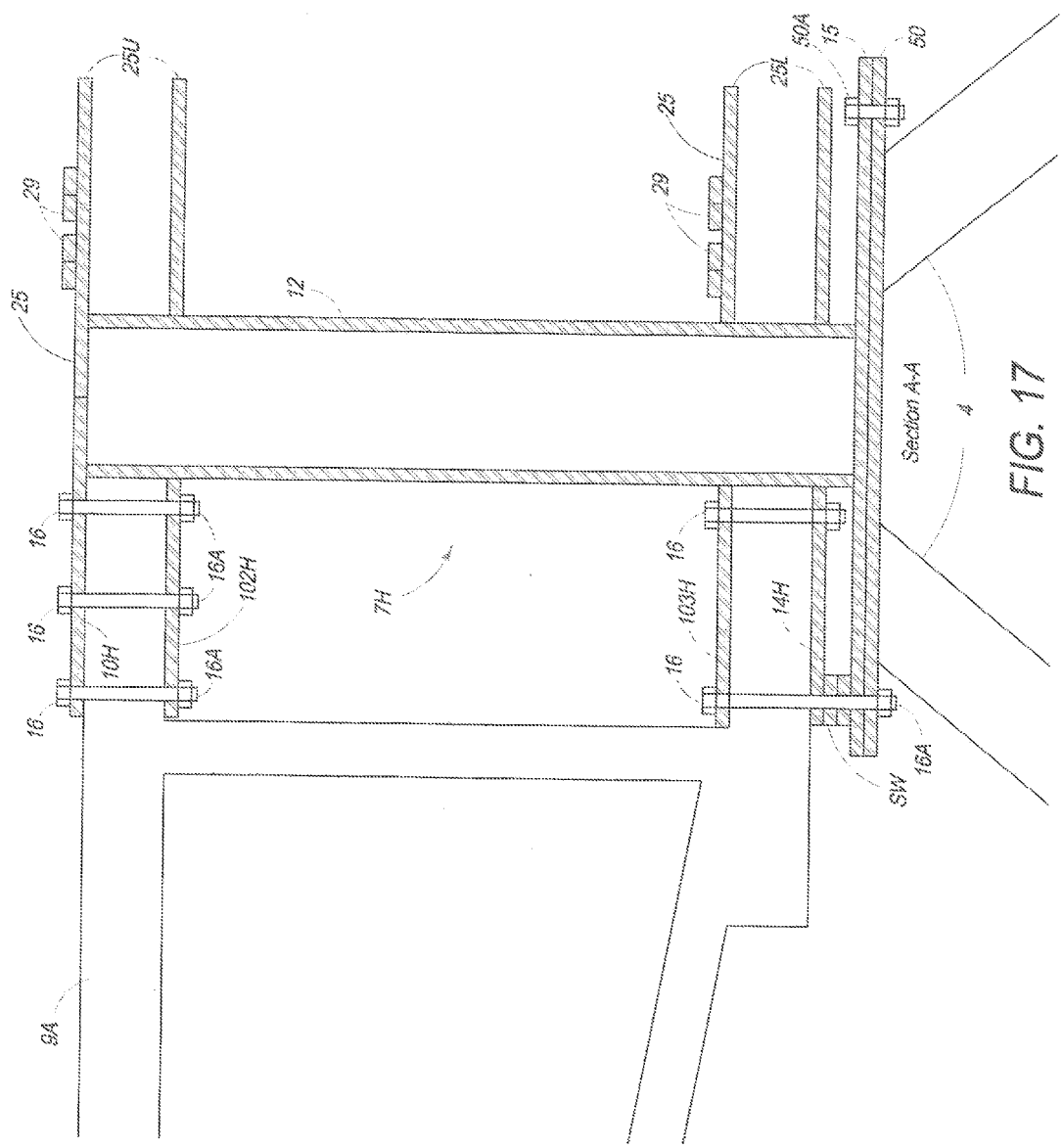
FIG. 17 is an enlarged cross-sectional view taken along line A-A of FIG. 15.
Figure 18:
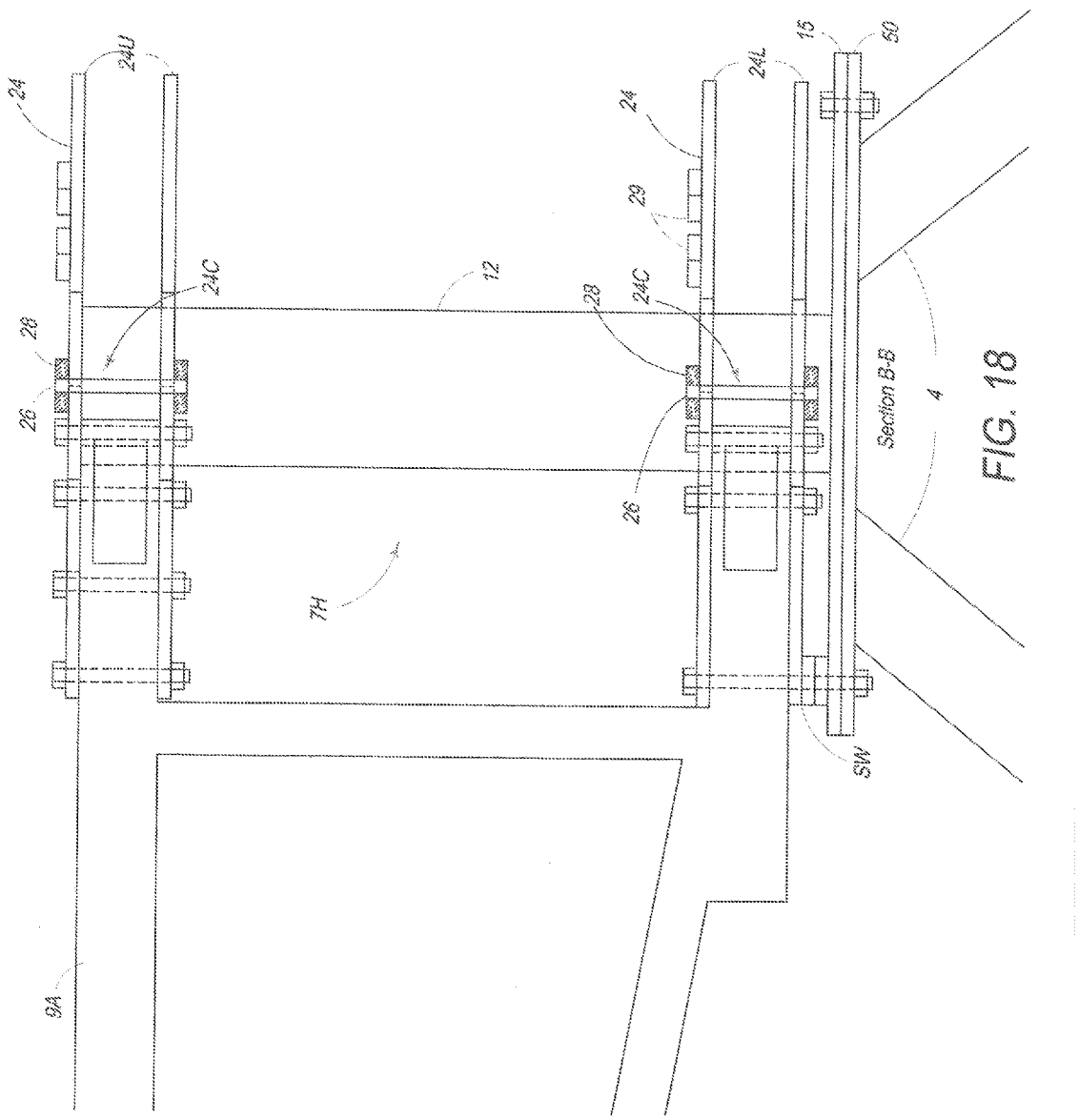
FIG. 18 is an enlarged cross-sectional view taken along line B-B of FIG. 15.
Figure 19:
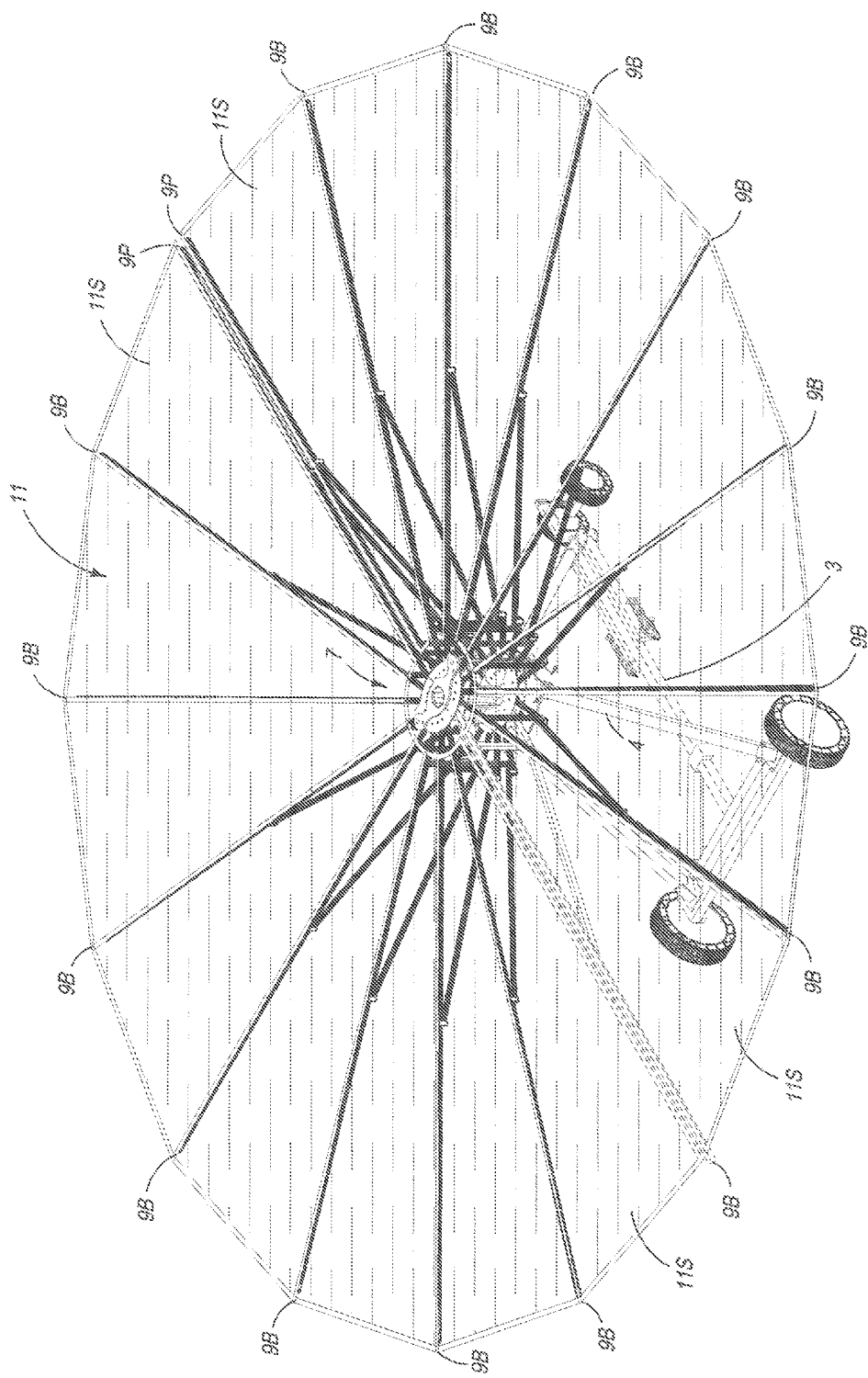
FIG. 19 depicts another isometric top view of the device shown in FIG. 4 equipped with the split arm deploying unit such as shown in FIGS. 15-16 and 22 which permits the deployment and retraction of the movable arms to one side as depicted by FIGS. 14-16.
Figure 20:
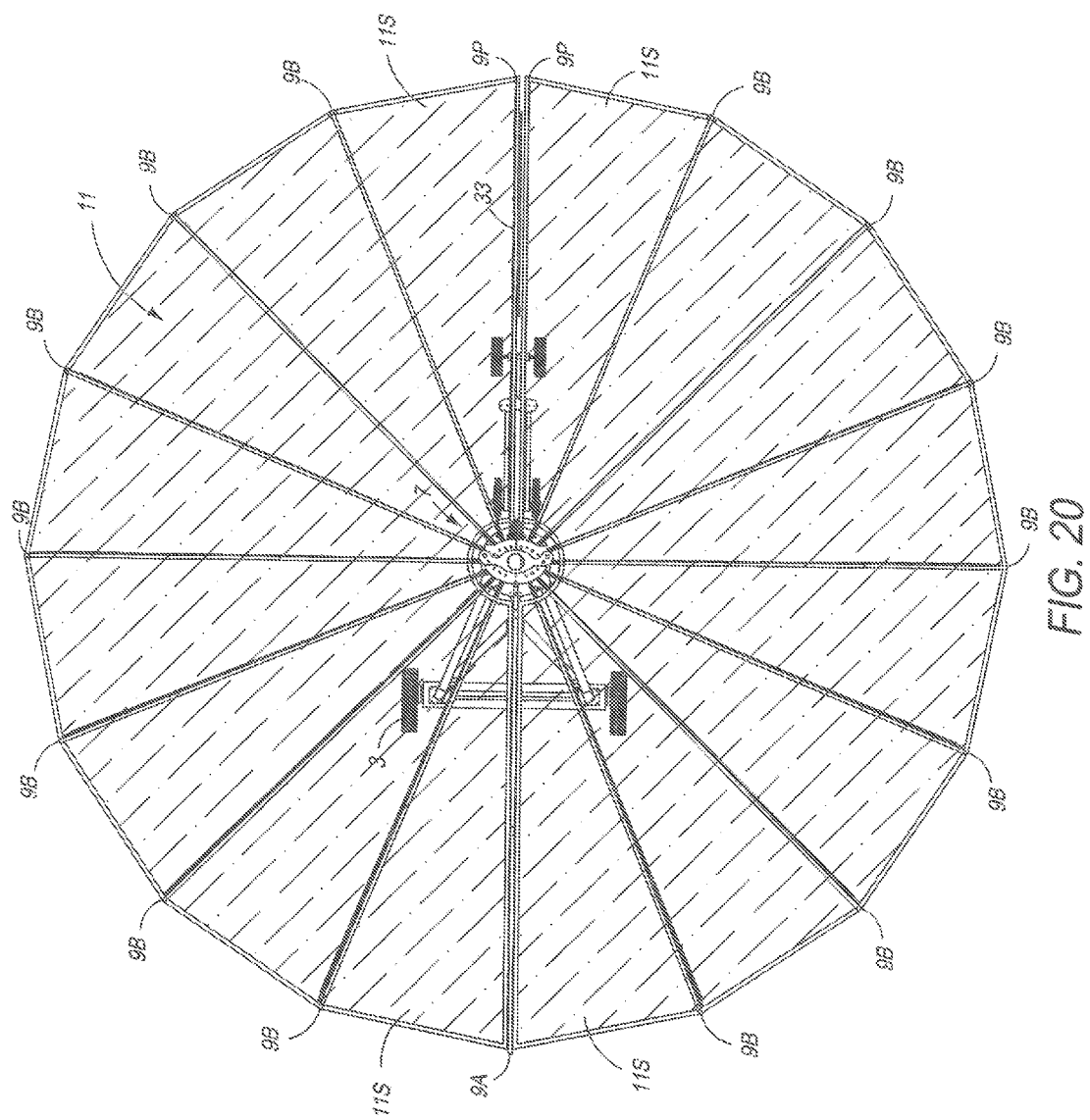
FIG. 20 is a top view of the device shown in FIG. 19.

The maximum legal single trailer length permitted for highway use is generally restricted to 53 feet to which the PPSD 1 herein may be readily adapted. As generally illustrated in the FIGS. 11 and 12, two oppositely positioned longitudinally aligned stationary arms 9A in a closed and transport position measures about 32 feet in length for 16 foot arms 9. Such a transport length easily meets most state transport regulations and thus provides a particularly useful transportable PPSD 1 for highway transport purposes and deployment. A 16 foot radius canopy 11 provides about 815 square feet coverage which may also be easily mounted and stabilized for transport with a conventional farm wagon. A 53 foot diameter canopy 11 provides about 2, 225 square feet coverage which coverage may be effectuated by lengthening the arms 9 such as by telescoping or hinging each arm 9 by an additional 10 feet. This results in almost tripling the shade coverage. If desired, the canopy 11 and the PPSD 1 may be larger or smaller size, all of which depend primarily upon the desired coverage and the desired transport considerations involved in its use. However, if desired, a flat bedded semi-trailer may be used for a highway transportable shielding device 1. All of the movable arms 9B may be positioned on one side of the deploying unit 7 as depicted by FIGS. 14 and 16, reducing the transport length to about one-half the size.

The length of the arms 9 will dictate primarily whether cross braces for the canopy 11, additional arms 9 or vertical arm braces 17 or truss braces 18 will be needed. The depicted arms 9 (e.g. see FIGS. 1, 6-9, 17-18, 24-25 and 28) measuring 16 feet in length afforded sufficient canopy bracing without requiring any other additional bracing except as depicted. The size, strength, length and weight of the arms 9 will likewise determine the necessary structural bracing needed to support and maintain a structurally sound canopy 11. Telescopic arms 9 meeting the roadway regulations, but extendable (e.g. telescoping) to a substantially longer radially length for larger coverage may be utilized provided adequate precautions are made to the supportive structure for the canopy 11 and arms 9. The open structure of portable shading device 1 about its entire perimeter affords shielding efficacy. This shielding provides a 360 degree animal access to the shading device 1. If needed, an outrigging stabilizing unit (prefixed by 8) with peripheral foots 8F to the support and adjustable mounted outrigging braces 8A & 8B and adjustable foots 8F to accommodate the device 1 to the particular terrain at the deployment site (as illustrated by FIGS. 4, 19-20 and 25-26) may be utilized to stabilize the deployed device 1.

As may be observed from FIGS. 7, 9, 13 and 15-16 the depicted movable arms 9 may be appropriately supported by two hinge pin mounts 20A and hinge pins 20 which in combination with the vertical arm brace 17 and arm truss brace 18 provides sufficient bracing to maintain a 16 foot radius or larger movable arm 9B at a desired horizontal positioning. The amount of underpinning bracing (e.g. 17 & 18) needed for any given arm 9 will also depend upon the construction material used as well as the structural design of the arms 9. The Figures also depict one or more stationary arms 9A mounted to the arm deploying unit 7 (e.g. see FIGS. 1-2, 6, 8, 11-20, 24 and 27. The depicted arms 9 may are illustratively constructed of conventional piping materials, although a host of other construction material may be used.

A balanced transportable PPSD 1 may be designed to retract for transport evenly along a stabilized longitudinal axis extending upon both sides of the deploying unit 7 as depicted by FIGS. 1-2, 6, 8, 11-13 and 27. This may be effectively accomplished by dividing the arms 9 into four quadrant canopy sections 11S with the forward two quadrant sections 11S of movable arms 9B folding forward about the deploying unit 7 onto a stationary arm 9A and the rearward two quadrant sections 11S of movable arms 9 collapsing or retracting rearward about the deploying unit 7 onto an oppositely positioned stationary arm 9A which features are depicted by FIGS. 8 and 11-13. Such a device 1 provides a balanced and longitudinally retracted PPSD 1 rendering it readily transportable while also minimizing the necessary undercarriage frame 5 and wheeled structure 3 needed to stabilize its safe transport and deployment. In contrast the collapsed PPSD 1 depicted by FIGS. 14-16 and 19-20 minimizes transport length by fifty percent (50%) while providing a sturdy frame 5 such as 5A, vertical support 4 and transport structure 3. This embodiment (as illustrated by the Figures) involves the pivoting of the movable arms 9B onto one side of the deploying unit 7. The wheeled transports 3 as depicted by the Figures generally provide a sufficient base support 5 or 5A for the vertical supports 4 when used with a terrain stabilizing unit (generally prefixed by 8).

The closing and opening of the radial arms 9 in an orderly fashion may be accomplished in various ways including manual and mechanically assisted deployment and closure. The depicted systems involve one or more stationary arms 9A and multiple movable arms 9B which are withdrawn or deployed into position (e.g. pushing and pulling) by one or more by movable driving arms 9P. The stationary arms 9A are positioned at a fixed longitudinal transport position while the drive arms 9P (e.g. driving or pulling) pull the canopy quadrant sections 11S including the non-pulling but movable arms 9B of each section 11S into position. The depicted deployment drive mechanism 13 or system for deployment and retraction of arms 9B & 9P (as particularly illustrated by FIGS. 2, 10-13 and 24-26) may include a system utilizing draw ropes 42 and rope drawn sections 42S (e.g. braided ropes, metal cables, natural or synthetic strings and the like) attached to each arm 9, a drawing or pulling arm 9P suitably positioned for each rope drawn section 11S (e.g. at 90° degree quadrant interval pull) to effectively draw or pull and retract the movable arms 9B to either the closed or open position. Pulling arms 9P may be manually or mechanically deployed to the open or retracted position or by manual operated or motorized winches and the like. The deployment drive mechanism 13 may be automated with electronic sensors to effectuate remotely or upon sensing activation (e.g. light or air speed sensors) an electronic or mechanical deployment or withdrawal of arms 9. The depicted device 1 utilizes a peripheral rope 42 or rope sections 42S which broadly embraces any suitable substitute therefore such as natural and synthetic ropes, metal, and plastic cables, chains, bands, straps, strands, etc. to deploy and retract the movable arms 9B to the desired position. As may be further observed by FIGS. 11 and 26-27, eyelet fittings 41 at the arms 9P ends with cable clips 44A or knots bracketing the movable driven arms 9P (e.g. see FIG. 27D) and stationary arms 9A (e.g. see FIG. 27A) at the appropriate arm 9 spacing or angular positioning enables the driving arms 9P to which pull or retract the driven arms 9B to the properly deployed or retracted position for the movable arms 9B. As illustrated by FIG. 27C the eyelets 41 of the pulling arms 9P may include a single clip 44 clipped to peripheral rope 42 or rope sections 42S to engage a drive arm eyelet 41 in the direction of the pull by the drive arm 9P. Clips 44 ensure that the movable arms 9B will be appropriately radially positioned about the canopy 11 at a desired predetermined radial position. It may also be observed from the FIG. 27C that the pulling arms 9P are depicted as resting in a side by side relationship when drawn to the open position along with their respective pulled canopy sections 11S. The canopy 11 as illustrated by the arm positioning shown by FIGS. 11-13 may consist of four quadrant sections 11S of which two canopy sections 11S are attached at the half section 11S midpoint to a stationary arm 9A so that the two quadrant sections 11S are pulled clockwise and the other two quadrant sections 11S counterclockwise away from each stationary arm 9A. FIGS. 2, 10-11, 19-20 and 24-27 further illustrate the operational use of a cable or rope 42 or rope sections 42S operationally connected to the pulling arms 9P to deploy the canopy 11 to an open or deployed position with a mechanical deployment drive system 13. The smaller sized PPSD 1 is more easily manipulated and may be manually closed and opened. In contrast, the larger PPSD 1 units may accordingly benefit from mechanized assistances to open and close the canopy 11.

As illustrated by FIGS. 21A, 21B, 21C & 21D the device 1 need not provide a complete shielding about a 360 degree arc. For certain uses it may be desirable or necessitate only a partial arcuate use of the device 1 such as the depicted 90, 180 or 270 degree angular canopy. Such partial coverage by the PPSD 1 may be used when a specific canopy shape is needed or desirable to match the particular environment of its intended use. For example, a sidewall café, a building entryway, patios, shaded sheds, bars, commercial buildings, hospitals, etc. may desire a partial acute or complementary shading arc (e.g. such as a semicircle or triangular canopy use).

Inspective of the desired use, a device 1 having a balanced retracting forwardly and/or rearward of the arms 9 positioned in a longitudinal alignment with the wheeled direction of transport constitutes a desirably attribute for rapid transit. The supportive arms 9 are typically adapted to provide a canopy 11 radially positioned about a horizontal axis. Canopies 11 characterized as having an apertured or porous structure in combination with dark color coupled with its substantially horizontal positioning at a desired elevation provides a highly effective heat and sun ray shielding device 1. A dark canopy color (especially a black canopy 11) serves as a heat absorbing surface entrapping heat at the juncture of the sun ray contact to the canopy 11 which then thermally heats the atmospheric gases about the canopy 11. This particular combination coupled with a porous (or knitted) or substantially air permeable canopy structure serves to heat the air directly beneath the canopy 11 surface which in turn results in dissipating the heated air upwardly through the porous canopy structure, above the canopy 11 and protectively away from the shielded animal. The air rising from the canopy 11 top surface in combination with perforated canopy structure results in convection currents being created by the heated air dissipating through the canopy top surfaces with cooler air convections rushing beneath the canopy 11 from all angles (i.e. 360 degrees) about the canopy 11 and thereby displace any trapped heated gases. The open area around and beneath the circular canopy 11 allows fresh air currents flowing about a 360° degree arc to flow beneath and through the canopy 11 to provide a highly effective evaporative cooling effect. The canopy 11 should have sufficient permeability so as to allow for effective dissipation of the heated air while also providing a sufficient solid structure to protect and shade the animal from the harmful effects of the sun rays. Canopy materials designed with the desired knitted and black canopy characteristics are commercially available for these sun-screening uses.

With particular reference to the Figures, FIG. 1 depicts a top view of portable protective shielding device 1 of this invention. The protective membrane 11 or cloth covering may be attached to a plurality of radially movable supporting arms 9B and stationary arms 9A by any means of fastening such as a plurality of clips, fasteners, sleeves, etc. as previously mentioned. The canopy 11 can be hemmed or sleeved, such that the cloth or material fits around the tubular supporting arms 9 using screws, clips, magnets or ties which in turn allows for easy assembly and disassembly of the canopy 11 from the device 1. These features (as depicted by the Figures) are particularly useful when attaching a new canopy 11 or removing a damaged or worn cloth/membrane canopy 11 from the arms 9. The device 1 includes a supportive base 5 (which may be provided by the wheeled undercarriage 3 itself) and a vertical extending section 4 which elevates the arm deploying unit 7 to a desired elevation. The desirable device 1 may be equipped with at least one wheel and axle assembly 6 to provide transportability to the device 1. The arm deploying unit 7 supports a plurality of movable arms 9B that stretch a canopy membrane or protective cloth material 11 about an arcuate section 11S such as when the canopy sections 11S are placed in an open position by a rotational movement of arms 9B. Retraction of the movable arms 9B to a closed position places the movable arms 9B in a longitudinally aligned transport position.

A wheel and axle assembly 6 may be incorporated into the device 1 so that the device 1 may be appropriately adapted for transport by vehicle. The deploying unit 7 is vertically and elevationally supported sufficiently to provide enough clearance for the animals desired to be shielded thereby. FIGS. 1-3 and 28 depict four vertical support legs 4 while FIGS. 4, 19 and 24-26 show a three legged vertical support 4. A single post 4 (not shown) may also be used as a vertical support of the deploying unit 7 provided its post structure is sufficiently stabilized. A tripod or quad-pod (i.e. legged) vertical supports 4 provides a well-balanced and stable support for the device 1.

The wheel-axle assembly 6 and the vertical support 4 as illustratively shown in the Figures effectively serves to provide the desired vertical distance between the deployed arms 9 and the supported canopy 11 above the ground level for animal sheltering and shielding. The desired clearance height will depend partly upon the particular animal desired to be sheltered by the device 1. For most shielding uses, a canopy 11 positioned from about six feet to about twelve feet ground clearance will effectively serve to shield most animals. By increasing or decreasing the elevation of vertical support 4, the desired clearance for any given animal or conditions may be accordingly achieved. It should also be evident that the device 1 may be equipped with a manual, automated or remote controlled elevating system (not shown) to adjust the deploying unit 7 and canopy 11 to a desired elevational height.

It may be also observed from FIGS. 3 and 4, the vertical base support unit 4 may suitably be equipped to include a mounting plate 50 securely anchored to the vertical support 4 (e.g. legs) to provide a firm base support for mounting deploying mast unit 7 thereto. As may be further observed from FIGS. 3-4, 5, 5A, 8-9, and 17-18, the mounting plate 50 may also be suitably equipped with mounting bolt receiving apertures 50A upon which the arm deploying unit 7 may be appropriately mounted thereto.

Figure 5A:
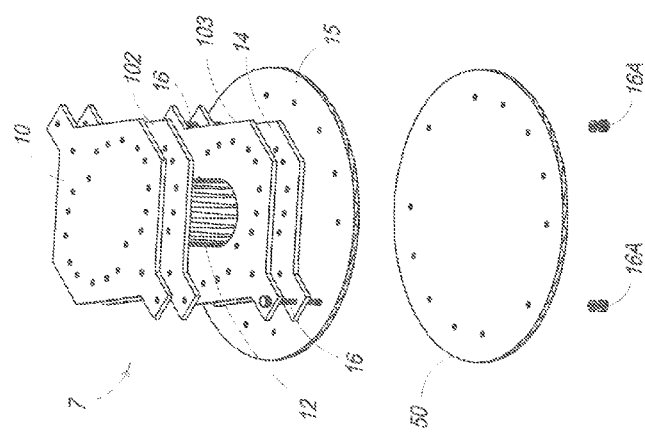
FIG. 5A depicts an isometric side view of an assembled deploying unit of FIG. 5.
Figure 5:
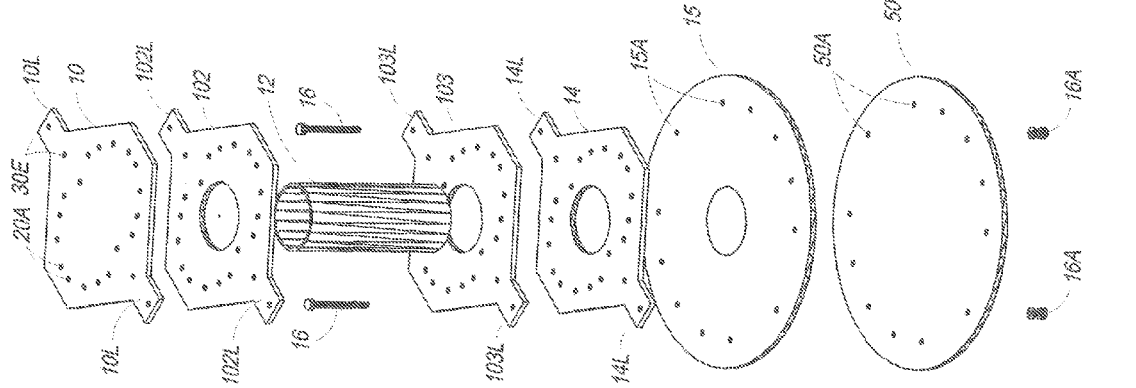
FIG. 5 is an isometric view depicting a dissembled deploying unit and the disassembled mounting plate shown in FIGS. 3 and 4 upon which the deploying unit mounts.

FIGS. 5, 5A, 6-7, 13-18 and 22-23 depict in greater detail the embodiments of a suitable arm deploying unit 7 for deploying and retracting the movable arms 9B and attached shielding canopy 11. The arm deploying unit 7 serves as a mounting hub for arms 9. The arm deploying unit 7 depicted by FIGS. 1-2, 5-5A, 6-9 and 12-13 includes arm supporting plates 10, 102, 103, 14, and plate 15 equipped to mount two stationary arms 9A which serves as anchoring points for deploying and retracting the driven movable arms 9B pulled or retracted by the drive arms 9P. The pre-assembled arm deploying unit 7 depicted by FIGS. 5 and 5A is adapted to securely mount onto mounting plate 50 which is rigidly secured (e.g. welded) to the upright slanting vertical extending leg support 4 ends as depicted. The two stationary arm deploying unit or deployment assembly 7 is depicted as including a cylindrical hub 12 onto which arm supporting plates 102, 103, 14 & 15 are securely anchored (e.g. welded) to cylindrical hub 12 at the proper spacing so as to permit the pivotal mounting of arms 9B & 9P thereto. The top arm mounting plate 10 of arm deploying unit 7 seats directly atop and welded to cylindrical hub 12. The bolt receiving apertures 30E of plates 10, 102, 103, 14, and 15 (as shown in FIGS. 5, 5A and 8-9) are positioned or spaced apart such that arms 9 may be appropriately connected to arm plates 10 & 102 and 103 & 14 so as to allow horizontal pivoting of the movable arms 9B about their respective pivotal axle mounts 50 in a hinged manner and in the retracted position nest in a side by side relationship. The mounting plate 50 is secured (e.g. welded) to mast support legs 4 carried by the wheeled transport 3. The base plate 15 which mounts onto mounting plate 50 may include spacing washers SW with sufficient spacing to allow pivotal movement of the arms 9 and mounting apertures for mounting the arm deploying unit 7 to mounting plate 50. The depicted base plate 15 of the arm deploying unit 7 may be appropriately welded to the deploying hub 12 with bolts and nuts being illustratively used for its attachment to mounting plate 50. The arm deploying unit 7 for mounting arms 9 thereto may be appropriately welded together or molded as a single piece deployment unit 7 as illustrated by FIG. 5A.

Figure 8:
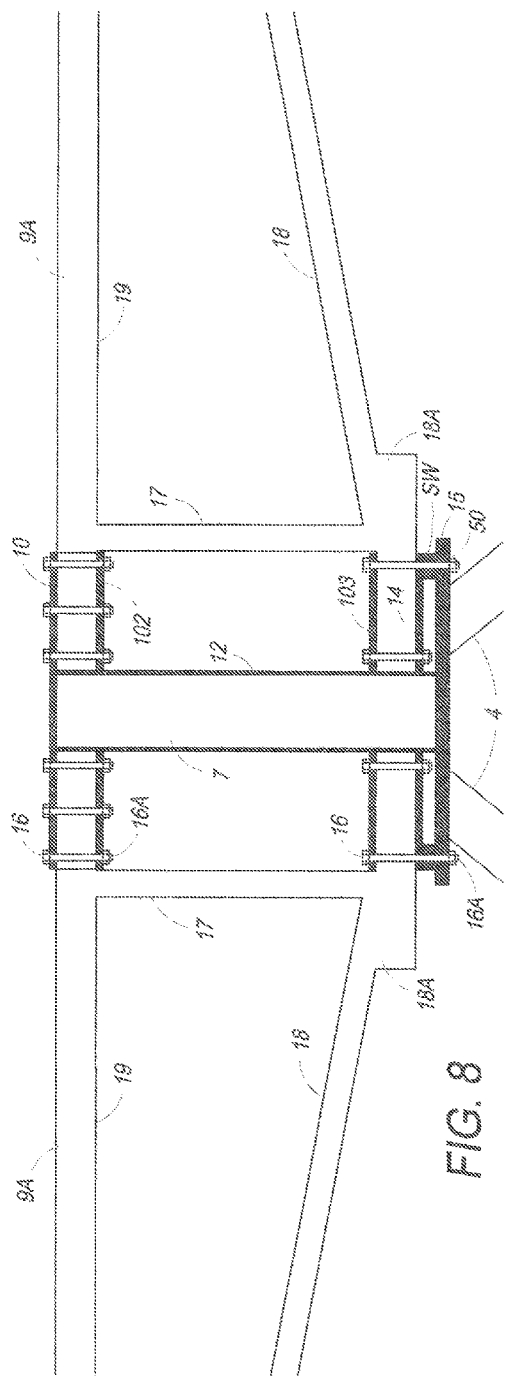
FIG. 8 is an enlarged cross-half sectional view of FIG. 6 depicting a portion of two stationary arms mounted to the deploying unit.
Figure 9:
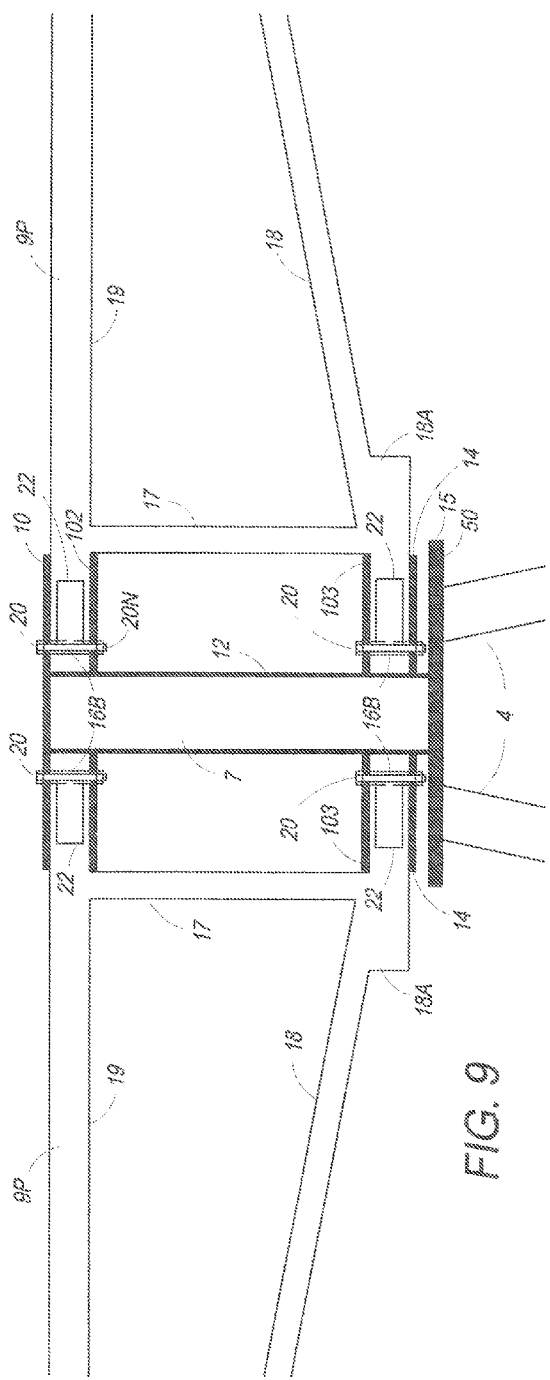
FIG. 9 is an enlarged cross-half sectional view of FIG. 7 depicting the deploying unit and a partial cross-sectional view of two movable hinged arms mounted thereto.

FIGS. 6 and 8 depict a bisecting cross-sectional view of the stationary arms 9A shown in FIG. 1 while FIGS. 7 and 9 show a bisecting cross-sectional view of the drive or pulling arms 9P. With reference to these Figures, the arms 9 are shown as being either as fixed stationary arms 9A or as movable pivoting arms 9B & 9P. The device 1 includes at least one stationary arm 9A. The device 1 as depicted by FIGS. 1-2, 6, 8, 11-13 and 27 includes two fixed or stationary arms 9A aligned and securely mounted to the arm deploying unit 7 in directional alignment with the travel or transport direction of the device 1. The fixed arms 9A act serve as the anchoring points for the movable or pivoting arms 9B. When fully retracted the movable arms 9B rest against the stationary arms 9A along with the collapsed canopy 11 in a closed position. When the movable arms 9B are radially positioned at an open position, the stationary arms 9A provide an anchoring position for withdrawing the movable arms 9B therefrom. Both the stationary 9A and pivoting 9B arms appropriately include components parts designed to maintain the arms 9 at a desired level and stabilized position.

As shown in FIGS. 6-9, 17-18 and 28, the arms 9 may be structurally stabilized by supporting a main arm beam 19 with truss supports 18 & 18A and a vertical support brace 17. The main arm beam 19 runs the entire radial length from its hinging point (bridging between plates 10 and 102) to its distal arm end which typically ends along the peripheral edge or outer border of the canopy 11.

The arm deploying unit 7 shown in FIGS. 5 and 5A may be appropriately assembled by welding together all of the component parts. The mounting plate 50 may be separately welded onto the vertical leg support 4 onto which the preassembled arm deploying section 7 may be bolted or otherwise secured thereto. As may be observed from FIG. 9, mast plates 10 & 102 provide sufficient clearance to allow the main beam 19 to receive hinging bolt 16 and nut 16A at the appropriate radial hinging positioning. As may be further observed from FIG. 9, truss arm support mount 18A is similarly provided with a hinging bore 16B for hinging truss 18 onto arm support plates 103 & 14 and thereby hinge a movable arm 9B thereto. As further illustrated in FIGS. 9 and 28, all of the movable arms 9B including the pulling arms 9P may be hinged to the deploying mast unit 7 in this manner. With respect to the stationary arms 9A (e.g. see FIGS. 8 and 17-18), multiple bolts and nuts 16B may be used to securely anchor the stationary arms 9A to arm plates 10, 102, 103 & 14 at a longitudinally aligned transport position.

The cross-sectional views of FIGS. 6-9 depict the arm mounting plates 10 & 102 adapted to receive a portion of the main beam 19 which extends onto the mount provided by arm mounting plates 10 & 102. The truss extension 18A provides the necessary positioning and extension needed to effectively mount the truss extension 18A and the attached truss support brace 18 to the arm mounting plates 14 & 103. The receded mount of arms 9 within arm mounting plates 10, 102, 14 & 103 at two receding positions or hinging points as provided by housing 28 and hinge pin 16 coupled with the stabilizing effect provided by vertical brace 17 provides a highly stable mount for arms 9. It accordingly follows that the arms 9 and mounting plates 10, 14, 102, & 103 effectively contribute towards maintaining the desired horizontal positioning of arms 9B & 9P upon deployment and retraction.

Figure 13:
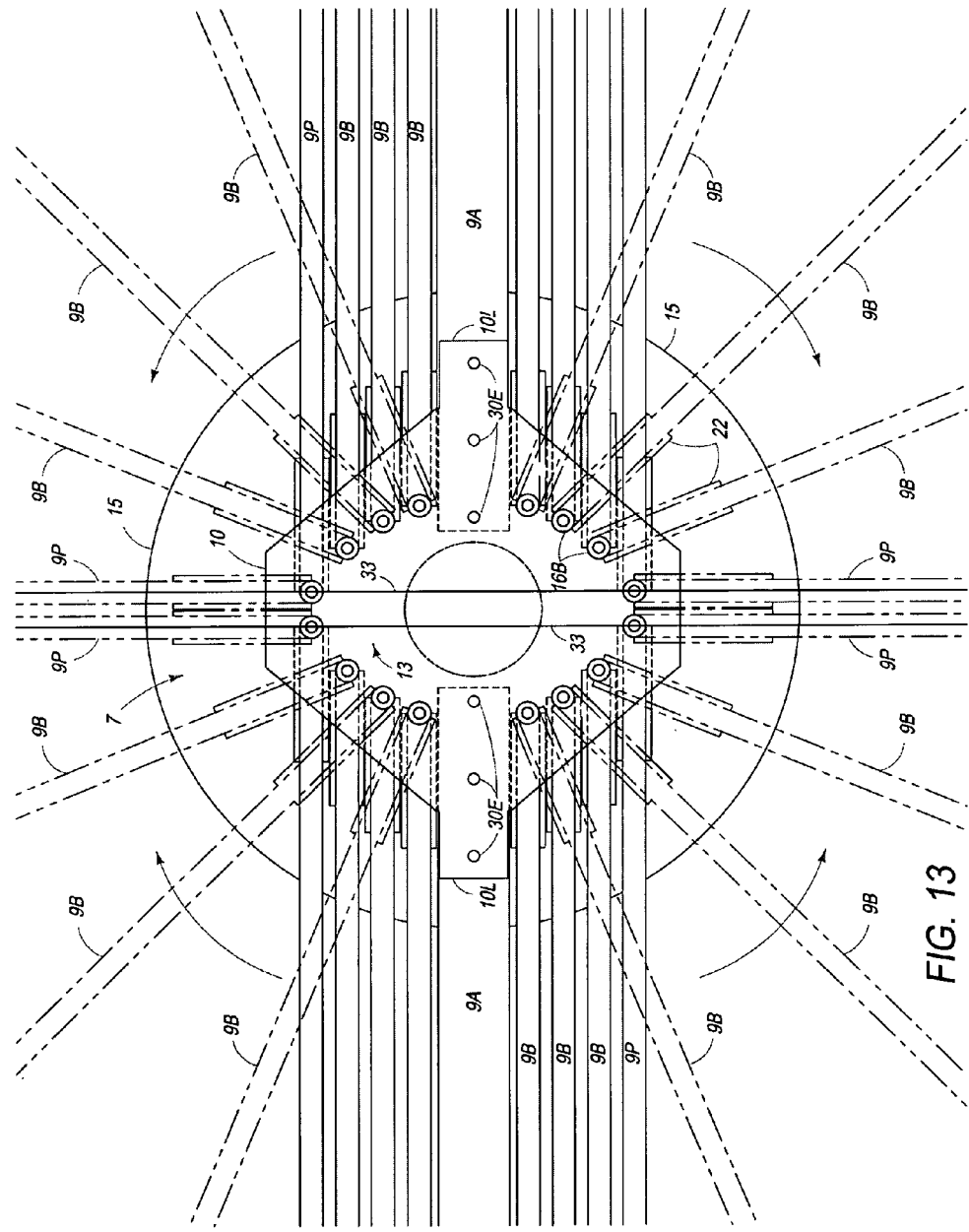
FIG. 13 is an enlarged partial view of the deploying unit of FIG. 12 with the arms in solid lines depicting the support arms in a transport position while the phantom lines depict the arms in the deployed or open position.

FIG. 8 represents a partial cross-sectional view depicting two stationary arms 9A as further depicted in the FIGS. 12-13 showing the main arm beams 19 for both arms 9A being bolted 20 onto arm plates 10 & 102 to restrict movement. The truss support ends 18A of stationary arms 9A are likewise securely bolted 16B to arm plates 14 & 103. With particular reference to the two fixed arms 9A of FIG. 3, the main arm beam 19 is shown as being anchored to the arm deploying unit 7 between plates 10 & 102 by multiple bolts 16B. The support truss arm 18A of slanted support truss 18 are similarly secured to the arm deploying unit 7 between plates 103 & 14 with bolted connections 16B. Spacing washers or plates SW or other suitable spacing pieces between plates 14 & 15 provide a gap sufficient gapping between two plates 14 & 15 to assist in maintenance and assembly during its manufacture. All of the plates (e.g. 10, 102, 14 & 103) except the mounting plate 50 depicted in the cross-sectional views as directly contacting tubular column 12 (e.g. see FIGS. 5A and 8-9) may be appropriately welded together to create the arm deploying unit 7 assembly of FIG. 5A.

FIG. 9 depicts a magnified cross-sectional view of movable arms 9B hinged to the deploying unit 7. Each main arm beam 19 of each movable arm 9B is sandwiched with sufficient pivotal clearance being provided by hinge pin mount 15B between plates 10 & 102 to permit pivotal movement of arms 9B & 9P. Truss end support 18A (see FIG. 28 for more details of connections) connected to truss brace 18 is also sandwiched with sufficient pivotal clearance between plates 103 & 14 via a single bolted pivotal mount which allows hinging of the movable hinged arm 9B via hinge pin bolt 16.

FIGS. 11-16 depict top views of arms 9 placed in the open and closed position without a canopy 11. The open protective position of the deployed arms 9 is shown by phantom lines. The collapsed arms 9 are shown by the solid lines shown as a horizontally stacking of arms 9. The retractable arms 9B & 9P and protective canopy 11 renders the device 1 easily deployable from its closed or retracted position to its open position. This results in a large area of coverage comparative to its compact and stowable form. These features also allow the protective canopy 11 to be readily collapsed or retracted under hazardous weather conditions such as hail or freezing rain, high winds, etc. The compact retracted structure allows the device 1 to be compactly stored inside a machine shed or other enclosures if desired. The character of its collapsed or retracted structure along its gravitational center also allows the device 1 to be easily transported at highway speeds meeting standard highway safety clearance, width and length as well as other regulatory rules. As may be observed, the movable arms (designated as 9B) include the pulling or drawing arms (designated 9P for illustrative purposes) which as latter explained serve to pull canopy quadrant sections 11S to an open position and draw or push the arms 9B of a quadrant section 11S to the closed position.

The pivotal and non-pivoting arm 9 features provided by the stationary arms 9A and pivoting arms 9B may be visualized by the deploying unit 7 depicted by FIGS. 5A, 6-9 and 11-13. The protruding lips designated pairs as 14L & 103L and 10L & 102L, serve as stationary or fixed arm mounts (e.g. see FIGS. 5 and 5A) for the stationary arms 9A. With reference to the two oppositely positioned stationary arms 9A illustratively depicted by FIGS. 6 and 11-13, the depicted pulling arms 9P are designed to serve 90 degree quadrant sections 11S with one fixed arm 9A longitudinally positioned at one side of deploying unit 7 (in longitudinal alignment with transport which stationary arm 9A serves two quadrant sections 11S) while the other stationary arm 9A is similarly positioned at an opposite side of the deploying unit 7 to serve the remaining two quadrant sections 11S. The quadrant sections 11S represent a quarter section of the canopy 11 when the device 1 is placed in the open position. The quadrant arm 9A & 9B section may deploy canopy sections 11S equipped with a corresponding rope or cable section 42S which via the drawing arm 9 draws and positions the deployed arms 9B & 9P away from the stationary arms 9A. The canopy section 11S may serve a larger or lesser sized area. It will be further observed that each quadrant sections 11S of service includes a pulling arm 9P which also is hinged in the same manner as the movable pivoting arm 9B. The pulling or driving arms 9P deploy the canopy 11 to a designated radial quadrant section positioning from the stationary arms 9A. Thus, it will be observed that each 180 degree canopy section 11S of canopy 11 is served by oppositely positioned stationary arms 9A wherein one pulling arm 9P positioned on one side of the stationary arm 9A will rotationally move clockwise while the other pulling arm 9P on the opposite side of stationary arms 9A moves counterclockwise when deploying the canopy 11 to either the open or closed position. Thus each of the two stationary arms 9A serve two pulling or driving arms 9P which service a 180 degree arc.

The arm deploying unit 7 depicted by FIGS. 11-20 and 24-27 function so as to uniquely pivot all of the movable arms 9B away from or onto a single stationary arm 9A. The driving arms 9P of the deploying unit 7 withdraw all of the movable arms 9B from a single stationary arm 9A to the open position and push or retract all of movable arms 9B to the closed position against arm 9A. The split plates deploying unit 7 is designed to compactly longitudinally retract all of the movable arms 9B to one side of the deploying unit 7 so that it may be highway transported easily by a single axle transport 3 as disclosed by FIGS. 4, 19-20 and 24-26. Instead of two arm quadrant sections 11S retracting backward and two quadrants sections 11S retracting forward, all of quadrant sections 11S retract and deploy from one stationary arm 9A position on one side of the arm deploying unit 7 as illustrated by FIGS. 11-20 and 24-27. The arm deploying unit 7 features are similar to the two stationary arm deploying unit 7 depicted by FIG. 5A except that an arm deploying half section 7H of the deploying unit 7 includes two pivotally mounted quarter section units 24 & 25 which are depicted in greater detail by FIGS. 15-18 and 22-23. The pivotally mounted partial plates 24 & 25 are independently hinged to oppositely positioned pin hinging columns 24C with hinge pin 16 (as depicted in FIGS. 14-16 and 18) such that movable plate sections 24 & 25 create a split in the two forward facing quarter sections 24 & 25 so as to fold back by retracting arms 9B & 9P against the single arms 9A on a single side of the arm deploying unit 7. This significantly reduces the overall transport length by about one half. In FIGS. 14-16 the solid lines again represent the retracted arms 9B and the stationary arm 9A while the phantom lines show the deployed movable arms 9B.

Figure 22:
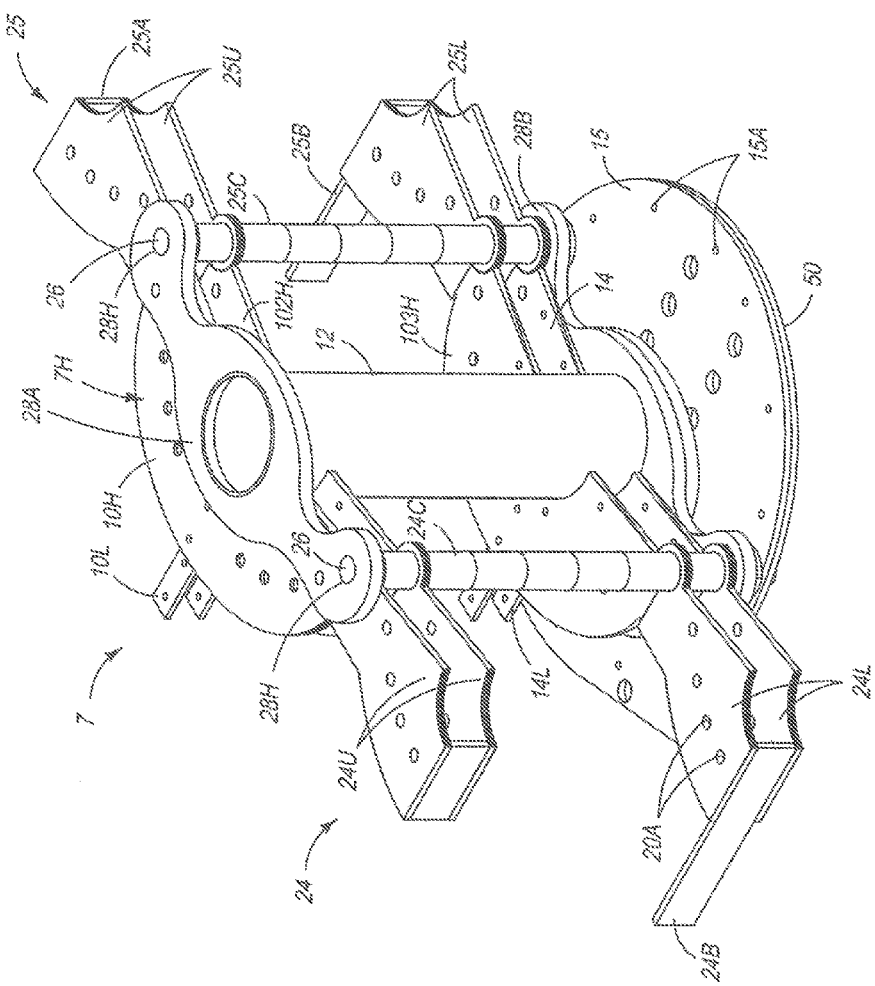
FIG. 22 is an isometric side view of an assembled deploying unit operationally positioned to withdraw the radially movable arms as depicted by FIGS. 14-15.
Figure 23:
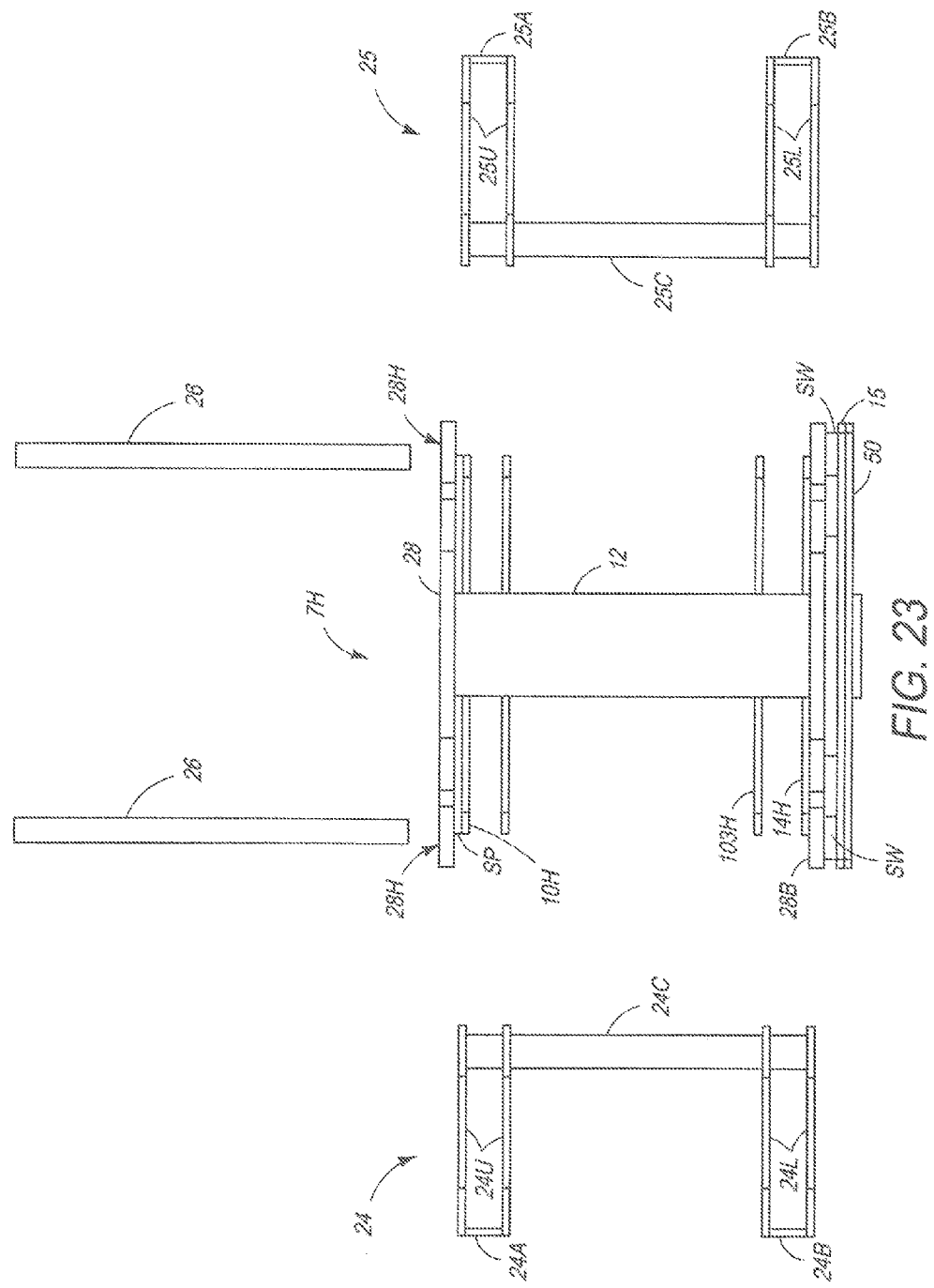
FIG. 23 is a front isometric view of the disassembled deploying unit shown in FIG. 22.

FIGS. 22-23, depict the split plates deploying assembly 7 in which all four quadrant sections 11S of the movable arms 9B when retracted are accordingly aligned in a common longitudinal direction on one side of the deploying unit 7. In this particular arrangement there exists one stationary arm designated as 9A about which all of the pivotally mounted arms 9B collapse or retract upon when the canopy 11 is placed in the closed position. The split plate deploying unit 7 depicted particularly by FIGS. 15-16 and 22-23 relies upon pivotally mounted split deploying plate sections 24 & 25 which are hinged to a half plate sections 7H. As may be observed from FIGS. 14-16, the hinged deploying sections 24 & 25 retract to a transport position as depicted by the solid lines of FIG. 15 and deploy to the open position as illustrated by the broken lines of FIG. 15 and the solid lines depiction of FIG. 16.

The isometric side view of FIG. 23 depicts an unassembled view of the split plate deploying unit 7. The unassembled deploying unit view of FIG. 23 depicts six basic components. The half plate section 7H includes basically the same elements as the full plated deploying unit 7 except for its hinge pin mounts 28M and its half section size. The main arm deploying half section 7H may be mounted to mounting plate 50 in the same manner as the arm deploying unit 7 of FIG. 5A. However the arm deploying half section 7H includes a top hinging plate 28A and a bottom hinging plate 28B equipped with hinging mounts 28M for mounting hinging members 24C and hinge pin 16 thereto which serve to hinge quarter sections 24 & 25 to the half plate section 7H. The split plates 24 & 25 also serve as a mount for the arms 9 by the lateral spacing provided by the split pairing of paired split plates of 24A & 24B and 25A & 25B. Hinge pins 16 serve to hinge the split plate sections 24 & 25 to the main deploying half section 7H. This cooperative combination of hinged split deploying sections 24 & 25 allows retraction of the deploying unit arms 9 to one side of the deploying unit 7 which provides a more compact transportable device 1 as in FIGS. 5 & 5A the paired half section plates 10H & 103H, and 103H & 14H serve as mounting plates for the arms 9 serviced by the half plate section 7H. As may also be observed from the split deploying section Figures, a single pulling arm 9P may be used to pull the movable arms 9B to the deployed position. However, larger sized canopies 11 may desirably use multiple pulling arms 9P.

Similar to the depiction of FIG. 12, four pulling arms 9P may be used to pull and retract the canopy 11 into position. Quadrant sections 11S of movable arms 9B are pivotally mounted onto integral combination of movable or hinged split plates 24 & 25 and half a plate section 7H which creates two forward quadrant sections 11S of movable arms 9B pivotally mounted to the split plate half section 7H which serve the remaining two quadrants of movable arms 9B adjacently positioned to the stationary arm 9A. Thus each quadrant side (i.e. two 90 degree quadrants per side) may be appropriately positioned to the open position by their respective pulling arms 9P and pivotally retracted to rest against stationary arm 9A by manually or mechanically pushing the pivotal arms 9B onto arm 9A. The two pivotally mounted split plate quadrants 24 & 25 have an appearance of a vertically positioned jaws which open to the withdrawn position and close together to provide an open canopy position. Gusset plate 22 serves as a welded gusset plate connecting the housing or bushing 16B for the pivotal pin or bolt 16 that pivotally hinges the moveable arms 9B to the deploying mast 7. It will also be observed from the Figures that mounting plate 50 includes mounting apertures 50A which correspondly mate onto base plate mount apertures 15A of the half plate section 7H.

FIGS. 22-23 depict in greater specifically an assembled and disassembled isometric view of split arm mounting plate sections 24 & 25 and half section 7H of a deploying unit 7 adapted to retract all of the movable arms 9B onto a single stationary arm 9A. The stationary arm 9A mount includes its normal half plate mounts (e.g. half plates which correspond to half sections of 10H & 102H and 14H & 103H) of half plate section 7H with flanged braces designated as 10L, 102L, 14L & 103L providing additional bracing support for mounting the stationary arm 9A thereto while also serving as pulling arms 9P stops when deployed to the open position. Hinge pins 20 are hinged onto the arms 9B & 9P in a similar manner as used for the mounting of hinged arms 9B to the full arm mounting plates 10 & 102 and 14 & 103 with top and bottom hinge pin housings 28H of hinge plates 28A & 28B both of which are welded to tubular cylinder 12. Spacing washers or plates SW are used to provide the appropriate positioning of the deploying mast unit 7.

With particular reference to FIGS. 15-16 and 22-23, these Figures illustrate the split arm deploying unit 7 in the retracted closed position and the open deployed position. The disassembled half section deploying unit 7H side view of the FIG. 23 includes paired arm half plates of 10H & 102H and another paired arm supporting half plates 103H & 14H both of which pairs are welded to plate support column 12 in substantially the same manner used for the corresponding full plates (i.e. 10 & 102 and 103 & 14) as depicted by FIG. 5A. At the top and bottom of support column 24C hinge pin mounting plate 28A & 28B with hinge pin receiving bores 28H are positioned and welded onto support column 12 so as to place the movable arms 9B in proper position for deployment and retraction by the half plates section 7H. Spacing washers or plates SW are used to provide the desired pivotal clearance. The paired arm holding quarter plate sections 24 & 25 includes upper paired plate arm mounts 24U & 25U for hinging the main beam 19 of the movable arms 9B at arm hinging apertures 16B with hinging bolts or pins 20. Similarly the lower arm truss support extension 18A may correspondly mount include lower arm mounting plates 24L & 25L. In mounting the movable arms 9B the pulling arm 9P are pivotally hinged in juxtaposition to closure stops 24A & 25B (not shown) and 25A & 25B. The hinging columns 24C & 25C hinge the quarter plate sections 24 & 25 to hinging bores 28H of hinge pin mounting plates 28A & 28B with hinging pins 20.

In the FIG. 23 side view of the split plate arm deploying unit 7, the arm retaining plates 24U & 24L and 25U & 25L are correspondly welded onto pin retaining columns 24C & 25C respectively which places the pivotally mounted arms 9B & 9P held by arm holding plates 24U, 24L and 25U & 25L in operational alignment with the corresponding arm holding plates of half section plate 7H. Thus when quarter sections 24 & 25 are pivotally pinned with hinge pins 26 to half section 7H, a shielding device 1 which deploys and retracts about the arm deploying unit 7 to a single side is provided.

Both split quadrant plates 24 & 25 are equipped with closure stops 24A & 25B interfacing onto one another when split plates 24 & 25 are drawn to the open position. Split plates 24 & 25 may be manually or automated so as to deploy and retract the movable arms 9B. Similar to the full plate assembly of FIG. 5A, the two pulling arms 9P may suitably be equipped with a quick fastener (e.g. a carabineer clip) which allows the looped rope 40A in the mechanized deploying system 13 as illustratively depicted by FIGS. 11 and 26 to be readily unclasped or clasped together. Such attachable and detachable fasteners may also serve as a convenient looped holder positioned upon a long pole to manually walk the pulling arms 9P to an open or closed position. However winches are equipped with stops to prevent cable or rope 42 unwinding which may also be used to retain the deployed arms 9 in the open position.

The arm deploying unit 7 includes one or more stationary arms 9A placed in stationary longitudinal alignment with the direction of transport. Two stationary arms 9A are used in the depiction of FIGS. 12-13 against which the pulling drive arms 9P (four) radial pull the movable arms 9B away from the two stationary arms 9A. In contrast the mode of operation for the depicted FIGS. 15-16 device 1 relies upon one stationary arm 9A and one or more drive arms 9P to pull or withdraw the movable arms 9B to the open position and push or retract the movable arms 9B to a retracted or closed position. The canopy 11 also includes at least one split canopy section 11S radially splitting the canopy into movable sections 11S which constitutes a separation of the canopy cloth so as to sectionalize the canopy 11 for radial movement about the arm deploying unit 7. A plurality of canopy sections 11S may be provided to create the opening and closure canopy features of the device 1. Although the Figures illustratively depict a canopy 11 and moving arms 9B divided in four quadrants or sections 11S, the movable arms 9B could be divided in half sections 11S or three or more canopy sections 11S each pulled by one pulling or drive arm 9P. Similarly a single drive arm 9P instead of two or more drive arms 9P may be utilized to pull or withdraw the split canopy section 11S from the stationary arm 9A. The sectionalization of the canopy 11 into four quadrant sections 11S is generally easier to deploy than larger sized canopy sections 11S. The canopy section 11S may consist of multiplicity of sections.

The invention provides stowable device 1 equipped with a canopy 11 designed to serve various different uses. As depicted by FIG. 21, the device 1 may be tailor made to fit a particular end use. The device 1 including its canopy 11 coverage may be composed of the supporting arms 9 and the protective membrane 11 which may be deployed into a variety of positions to fit numerous applications of use. FIGS. 21A, 21B, 21C and 21D illustratively show four different angular configurations of a deployed canopy 11. A quarter section deployed state may be appropriate if a partial shade is needed or if the device 1 needs to be assembled at a reentrant corner such as near the inside corner of a building. A 50% deployed state which may be desired if the device 1 is to be used to provide shade along a building sidewall. Similarly the 75% deployed may be appropriate if partial shade is needed for shading of an outside building corner. However, the 100% deployed state of FIG. 11 is most suitable for the open field applications. In horticulture crop rowing, a complete canopy 11 deployment such as in the harvesting of rowed crops may be unnecessary. The depicted device 1 can serve these multiple uses. A device adapted to service a deployment illustratively ranging from about 30 to about 60 degrees (e.g. clover leaf configuration) on each side of the arm deploying unit 7 transverse to the direction of deployed transit under such circumstances may adequately provide the desired shielding effect.

The movable arms 9B require a manual or mechanical means for deploying movable arms 9B & 9P to open and close to the desired position. Although the pivotally hinging of the movable arms 9B around a circular deploying unit 7 provides a host of desired configurations for an end use, the arms 9B need not be mounted in a circle or pivotally mounted. For example, the movable arms 9B may be mounted within a track of various arcuate configurations or utilizes split arm deploying units 7 which provide the desired positioning of arm deployment. For example for row crop uses, the movable arms 9B may be tracked so as to be positioned in a desired transverse relationship to the rowed crops.

Figure 2:
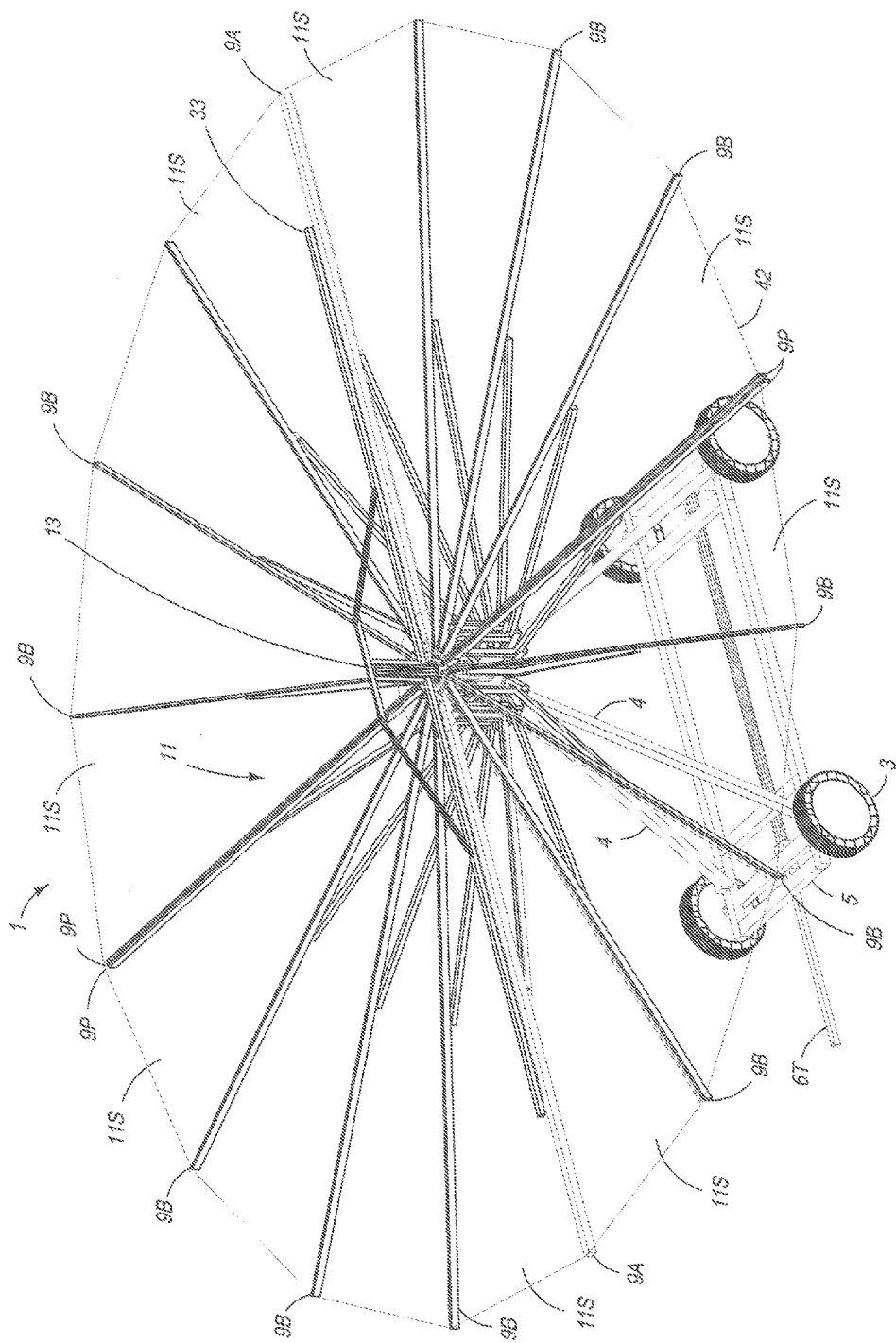
FIG. 2 is an isometric top side view of the wheeled undercarriage of the device shown in FIG. 1 equipped with a deploying drive mechanism.
Figure 24:
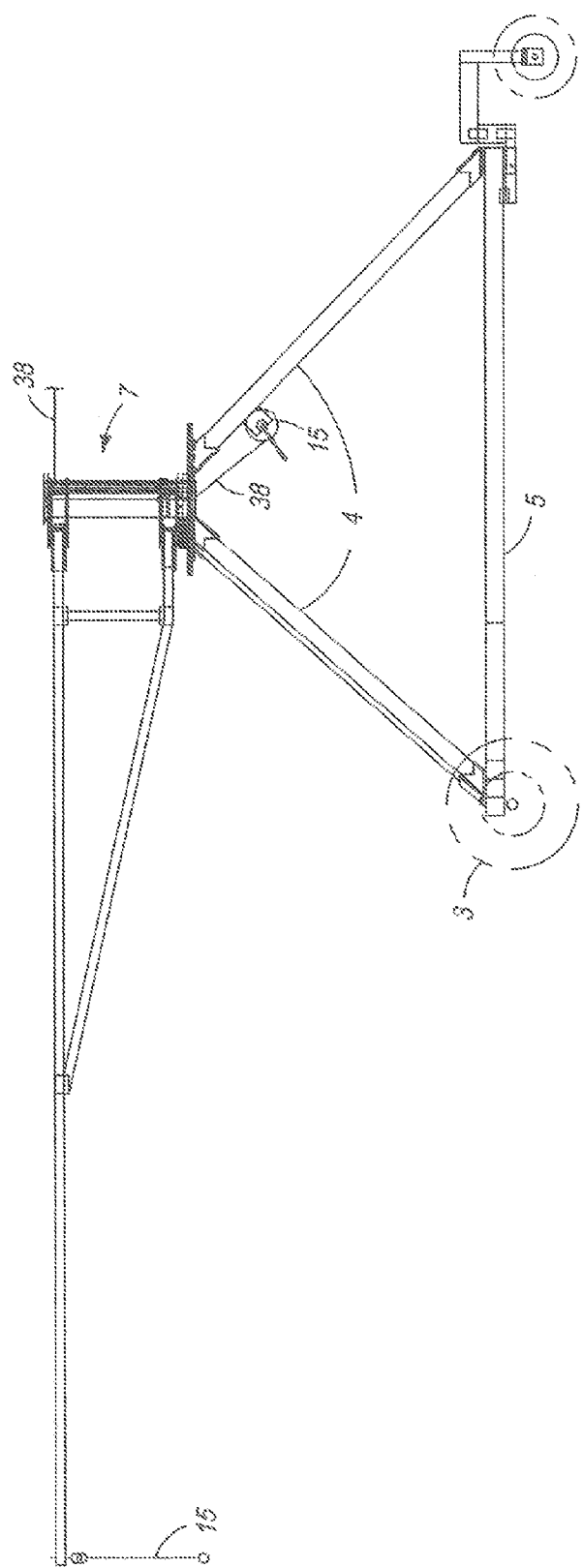
FIG. 24 is a side view of FIG. 19.
Figure 25:
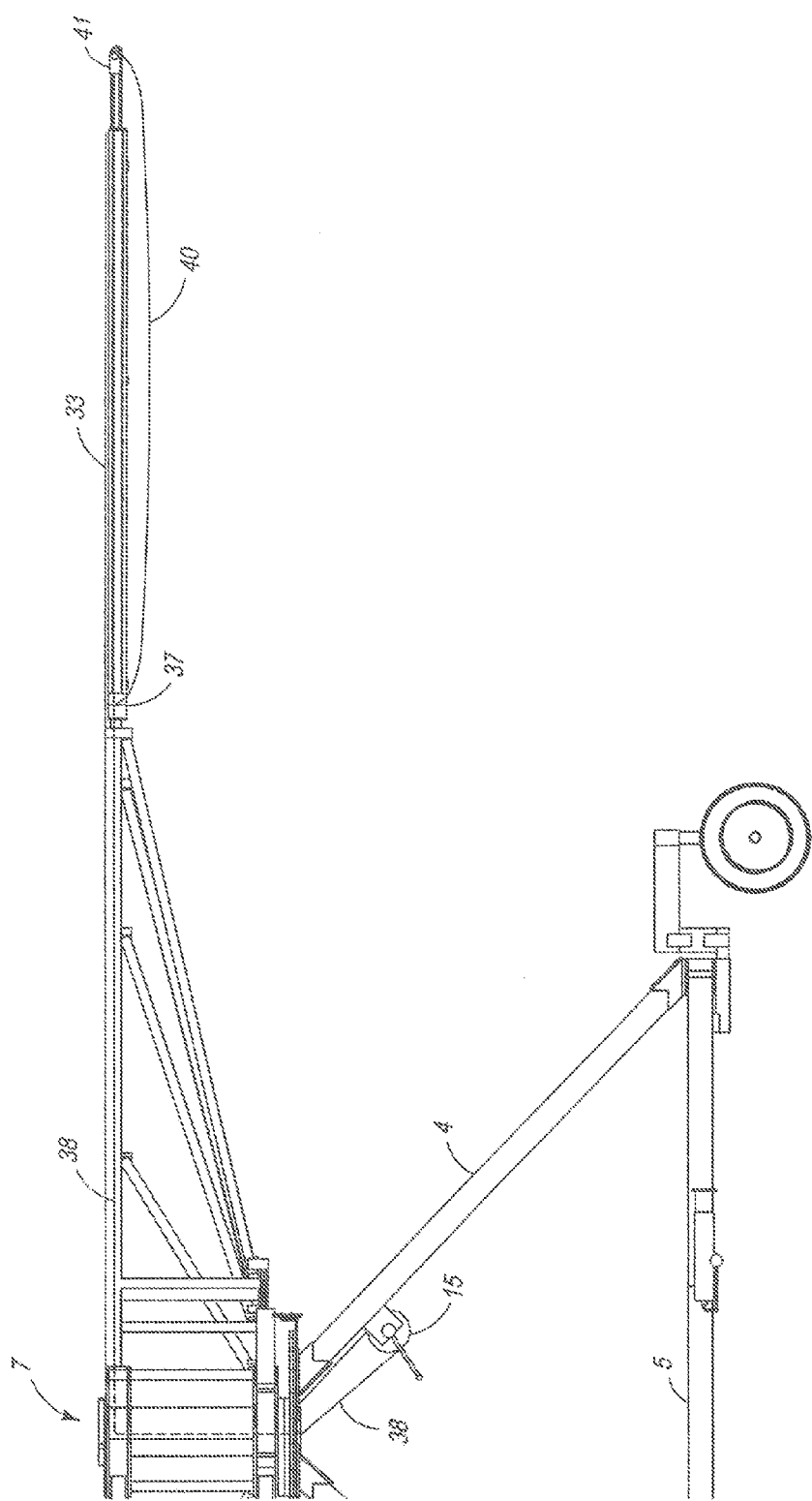
FIG. 25 is an enlarged partial opposite side view of FIGS. 19 and 20 showing in greater detail the deploying drive mechanism.

Although the pulling arms 9P and movable arms 9B may be manually pulled and pinned at a desired open position, the use of a deploying drive mechanism 13 to deploy the arms 9B is helpful. A manually operated deploying drive mechanism 13 may utilize mechanical means to apply leverage in order to ease deployment. FIG. 2 and the partial view of FIG. 25 depicts an overall view of a deploying mechanism while FIGS. 10, 10A, 11 and 24-27 elaborate upon in more detail the specifics of the types of deploying drive mechanisms 13 which may be used to deploy the pivoting arms 9B and protective canopy 11 to a shielding position. FIG. 10 depicts a boom assembly 13B of the drive mechanism 13 which may be appropriately securely attached to the top plate 10 of the deploying unit 7. The boom assembly 13B of FIGS. 10 and 10A depicts a deploying mechanism 13 mounted atop the arm deploying unit 7. The boom assembly 13B serves to effectively draw together the pulling and retracting drive arms 9P to the open position. The boom attachment 13B includes a pivotally mounted beam section 13P which swivels about the arm deploying unit 7 to position boom 13 in an appropriate position for pulling or retracting arms 9P. The deployment mechanism 13 allows the canopy 11 to be fully deployed by drawing pulling arms 9P to the corrected open position. The boom attachment 13B is shown as being structurally including a main track beam 33 structurally supported by truss brace 32 and vertical brace 13. The main beam 33 houses track 33A equipped with a pair of tracking rollers 37 as shown in FIG. 10A longitudinally aligned along the main boom beam 33 on one or both sides of the arm deploying unit 7. The depicted boom attachment 13B also includes a mounting base 35A securely mounted atop of the arm deploying unit 7 such as bolted to plate 10. The mounting plate 35A includes a cylindrical member 35 which serves as an axle for the boom attachment 13B. The pivotal portion of boom attachment 13B includes hub 34 which is depicted as a hollow cylindrical tube 34 of a slightly larger ID than the OD of pivotal axle hub of cylindrical member 35. Hub 34 according freely rotates about the deploying unit 7 as the main track beam 33 and its housed track 33A are appropriately positioned about an arc served by the movable arms 9B. The boom attachment 13B is especially useful for drawing and retracting of the drive arms 9P.

The main track beam 33 houses longitudinal track 33A onto which a two tandem wheeled tracking rollers track 37 as shown in FIG. 10A. The track beam 33 is securely attached to the supporting truss members 32 and vertical braces 13V. As depicted in FIGS. 10 and 10A the rollers 37 track within track 33A. A rope or cable 38 slideably engages within an apertured rope or cable retainer 37A through which the cable rope 38 freely slides when drawn or retracted by winch 29. The cable 38 may be accordingly operationally connected to one end to a winch or windlass 29 (shown in FIGS. 24 and 25) suitably positioned to an appropriate cranking position (e.g. mounted to legs 4) while the other rope end connects to a system of cables or ropes 40A and clips such as depicted by FIGS. 27 and 27A-27D for facilitating the deployment of the moveable arms 9B and particularly arms 9P. A rope or cable 38 used to deploy the pivoting arms 9 is tightened or loosened at one end by hand or by a winch 29 which may manually or electrically powered. As may be observed, the winch 29 may also serve as a retaining member 29 for retaining the movable arms 9B in the closed open position whereas detachable fasteners (e.g. carabineer clips) connecting the pulling arms 9P to each other or a stationary arm 9A may be used to retain the canopy 11 in the closed position.

Figure 26:
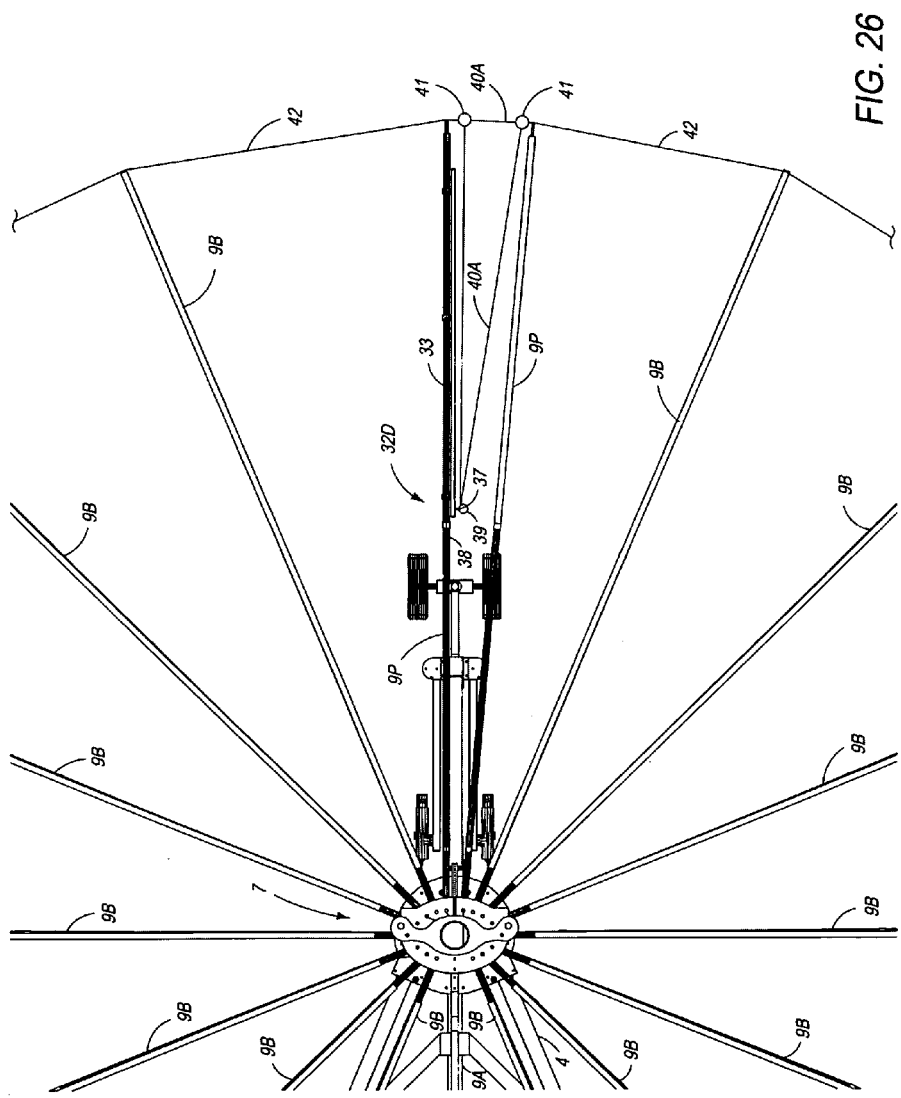
FIG. 26 is a top view of FIG. 25 showing the deploying drive mechanism pulling a movable arm towards the opened canopy position.
Figure 26A:
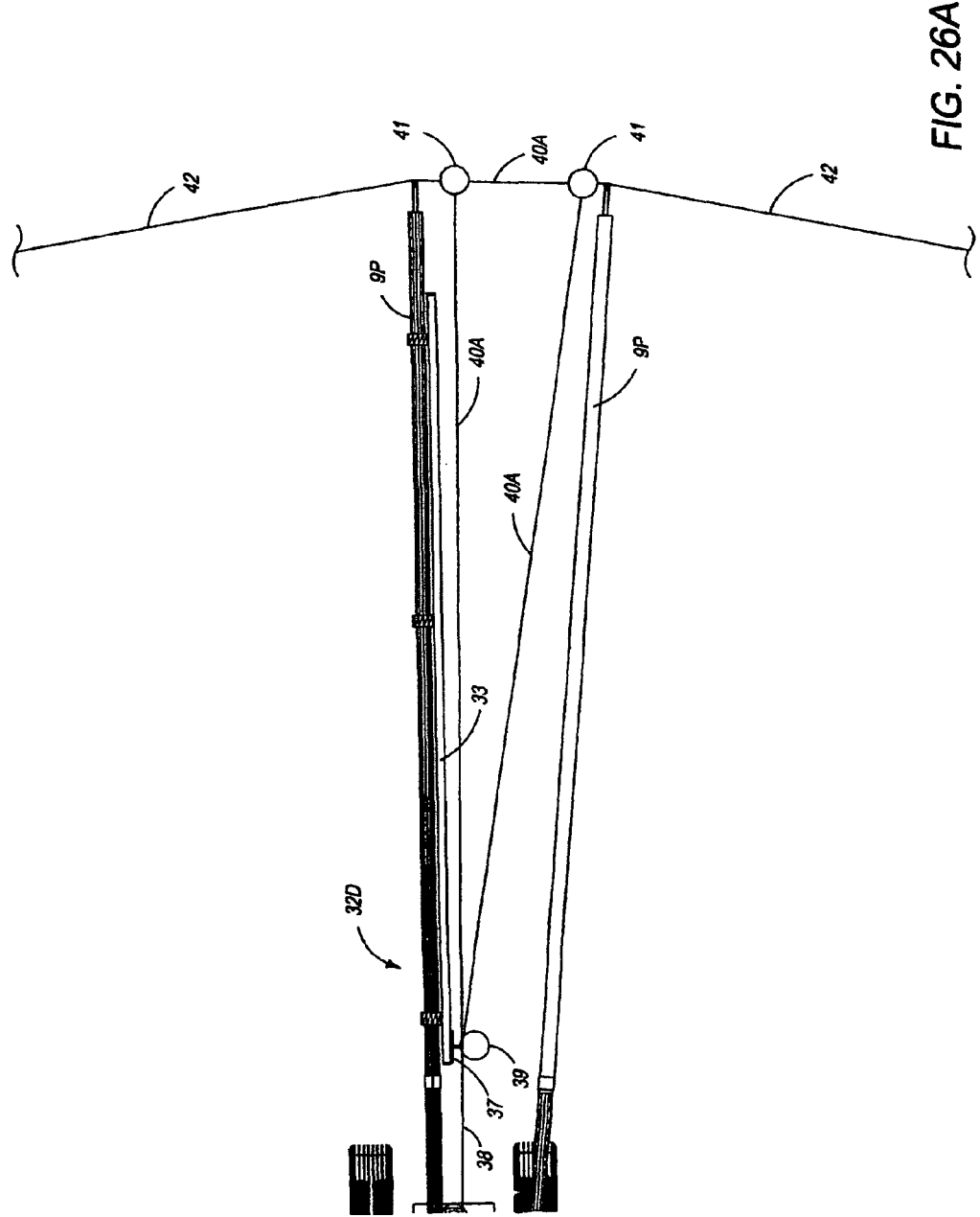
FIG. 26A is a partial enlarged view of FIG. 26

FIG. 26 depicts a partial top view of the deployment mechanism 13 of FIG. 25. The track rollers 33 are slideably attached to a cable 38 which connects to ring or clip 39 (e.g. a carabineer or spring locking clips, etc.) which in turn connects onto an apex of triangular loop 40 (e.g. cable or rope). Triangular loop 40 fastens to ring or clip 39 which runs through two eye bolts 41 affixed to the two terminating ends of pulling arms 9P. It will thus be observed that when tracking roller 37 is then pulled back along track 33A by retracting means such as a winch 29 (e.g. manually, electric motor, etc.) the retraction or deployment of the pivoting arms 9 and the canopy 11 via driving arm 9P may thereby be effectuated. The movable pivoting arms 9B are shown with phantom lines. The cable or rope drive assembly 40 consists of at least two cables or ropes 40A which are hung to the ends of the arms 9, which in turn are latched at a central point by a ring or similar eyelet unit 39 that connects to cable 38. The arms 9B may also be manually latched or unlatched beneath the canopy 11. The loose hanging rope or cable 38 ends are desirably positioned so that livestock will not destroy or disrupt or be harmed by ingestion of the cable 38. The deployment mechanism 13 may also double as an anchoring or immobilizing system when the system is collapsed by retaining arms 9 at an immobilizing state. This may also be achieved by using rope drive assembly 40 by wrapping the cable or rope 38 around the retracted arms 9 and tying the loose ends to the supporting legs 4. In FIGS. 26 and 27 the rope or cable 42 is depicted as pushing or pulling the movable quadrant arms 9B to the desired position.

FIGS. 27A-27D depict in more detail a circumferential rope or cable 42 which provides to each quadrant a desired tension upon of the protective canopy 11 while allowing fully tensioned moving arms 9B to be pulled by a pulling arm 9P as shown in FIGS. 26 and 27. The perimeter cable 42 includes segment stops 44 which provides equidistant segments or distances between each arms 9 with each movable arm 9 being fitted with stopping cable clamps 44 on each side of an eyebolt 43 as shown in FIG. 27D or any similar connection which fixes the rope and the angular positioning of each deployed arm 9B. With reference to FIG. 27A, the perimeter cable 42 runs through arm eyelet connections 43 which are fixed to the stationary arms 9A in the same fashion as with the movable arms 9 of FIG. 27D. The ends of perimeter cables 42 terminate at arm section eyelets 41 carried by pulling arms 9P at a terminating connection near or at terminal point 41 as depicted in FIGS. 27 and 27C. Throughout the perimeter of cable 42 several cable tensioning members 45 (as depicted in FIG. 27B) are periodically installed to allow the user to tighten the cable 42 which is attached to the canopy 11 with clips (not shown) threaded through the canopy seams along the perimeter of canopy 11. The cable tightening system 45 effectively allows for post-tensioning of canopy 11 which prolongs its useful life. It is again noted that FIG. 27A depicts a stationary arm 9A showing clips 44 bridging eyelet 43. FIG. 27C depicts the pulling and retracting movable arms 9P at an end of a canopy section 11S while FIG. 27D shows cable clips 44 for movable arms 9B positioned between the stationary arm 9A and the pushing and pulling arms 9P of FIG. 27C.

FIG. 28 depicts in more detail a suitable assembly for the arms 9. The arms 9 of FIG. 28 are depicted as including component element which is shown in more detail in enlarged FIGS. 28A, 28B, 28C, 28D, 28E and 28F. The arm 9 is shown in FIG. 28 as having a main arm beam 19 braced by support truss brace 18 with a truss end support 18A further braced by vertical truss brace 17. The tubular axis assembly 9 is strengthened by, gussets 18B &18C welded onto the tubular assembly of arm beam 19, truss support 18, and end truss support 18A. Different type of useable gussets for 18B & 18C are depicted in FIGS. 28A, 28B, 28C & 28D. The distal or pivotal end of the movable arms 9B may be appropriately fitted so as to allow arms 9B to pivot about a pivotal axis. FIGS. 28, 28E, and 28F illustrate suitable pivotal or hinging connections 46 affixed to the distal end of arm beam 19 and truss end support 18 each of which may be suitably equipped with a bushing to allow arms 9B to more freely pivot about hinge pin 16. FIG. 28E depicts a similarly pivotal arm assembly 9B, which as depicted in FIG. 9, utilizes a rectangular gusset 22 (shown in FIGS. 28E and 9) at the pivotal ends of main beam 19 and vertical support 17 which in turn are respectively sandwiched with clearance between plates 10, 102, 103 & 14 pinned with pivotal arm hinge pins 16 providing pivotally pinning or hinging of the arms 9B thereto. In more detail gussets 18B are depicted as serving as an angled connection between rectangular tubing with welds connecting gusset plate 18B directly to truss brace 18 and main beam arm 19. With regard to main beam 19 and truss brace 18 connective unit of FIG. 28B, there is disclosed an angular connection of round rectangular tubing, having a main beam collar 90 with pin connection 47 connecting onto adjustable truss fitting 91 connecting onto truss 18 which allows for various angled connections. Set screws 48 secure the collar 90 onto the main beam 19 and set screw 48 sets a collar truss 91 at the appropriate truss bracing angle. In FIG. 28C, gusset plate 18C provides an angular connection for rectangular tubing which connects gusset plate 18C onto truss 18 and the lower arm support leg 18A. FIG. 28D shows a tubular fitting 18E angled for connecting of round tubing. Fitting 18E is fitted with collars 90 & 91 equipped with apertured flanges which swivel about joint connection 18E. Set screws are used to tighten fitting collars 90 & 91 of member 18E to arm truss arm sections 18 & 18A.

The pivotal connectors 46 depicted by FIGS. 28E and 28F serve to pivotally mount movable arms 9B about arm hinge pin 16. The FIGS. 28E and 28F pivotal connectors 46 serve to link and hinge arms 9B onto via hinge pin 16 to the deploying unit 7 as depicted by FIG. 9 as well as a stationary arm mount as shown in FIG. 8. The FIG. 28F assembly connects the truss member 18, using rectangular tubing for construction for 9B & 9A, a gusset plate connects arm tubing to small round hollow tube that fits bolt or drop hinge pin 16 that acts as hinge. Pivotal connectors 46 connect 16 or serve as a hinge point to truss members 18 & 18A. Using round tubular construction of 9B & 9A, a pipe fitting T-socket connection houses a smaller round tube fixed to a fitted tube that fits onto a bolt or drop pin 16 which serves as a hinge. FIGS. 28A and 28B depict two different means of connecting brace 18 to the main arm beam 19. In these Figures gusset 18B is welded onto the main arm beam 19 and arm brace 18 to serve as a structural connector therefore. FIG. 28B depicts a main beam collar 90 and brace collar 91 hinged upon pin 47 with set screws 48 setting the fitting assembly 18D to a bracing position. Similarly FIG. 28C depicts the same assembly depicted in FIG. 28A except gusset 18C connects brace 18 to end truss support 18A. Similarly the same fitting assemblage used in FIG. 28B is used in FIG. 28D to connect truss brace 18 to end truss support 18A.

With reference to the deployment mechanism 13, FIGS. 10 and 10A depict an attachment useful as a drive mechanism 13 for deploying and retracting the moveable arms 9B about the arm deploying unit 7. As depicted in FIG. 10 the deployment attachment (generally referenced as 13) may include a mounting plate 35A which mounts (e.g. with bolts 31 and nuts 31A) the mechanism 13 atop the deploying unit plate 10 of the arm deploying unit 7. The attachment 13B includes two cylindrical columns composed of a lower column 35 and a slightly larger diameter upper column 34 which allows the larger upper column 34 to freely rotate about the axle formed by the lower column 35. It is immaterial which tubular column is larger since the desired purpose is to provide rotational movement.

The upper cylindrical column 34 supports truss support 32 and the main tracking beam 33. The main tracking beam 33 houses track 33A and trolleyed wheels 37 onto which a rope or cable 38 slideably engages. The rope 38 passes through eyelet 37A carried by the wheeled trolley 37 as shown in FIGS. 10 and 10A. FIG. 26 depicts a top sided view of the boom assembly 13B depicting and the connective point of rope 38 with rope retaining eyelet or loop 39. As may further be observed from FIGS. 26 and 27, pulling arms 9P are also fitted with rope engaging eyelets 41 which upon the pulling or drawing trolley 37 inwardly which causes pulling against arm eyelets 41 to be drawn together by rope loop 40A until the movable arms 9B are placed in the open canopy position. Positioning the movable arms 9B in the closed longitudinally aligned position may be effectuated by pulling or drawing rope 38 outwardly sufficient enough to allow the moveable arms 9B to rest in alignment with the stationary arms 9A.

The opposite end of rope or cable 38 may be utilized to manually, mechanically or otherwise pull the rope 38 to the closed position or allow it to withdrawn sufficiently to permit the arms 9 to rest in the desired transport position. If the rope 38 is manually drawn and released precautions should be taken so that a rope loose end is not available to the animals sheltered within the device 1. As depicted by FIGS. 24-25 the end of rope 38 opposite from the drawing end may be fitted with winch 29 which may effectively serve to draw the arms 9 to the open canopy position and release the closure thereof by the unwinding rope 38 from winch 29.

It should be noted the depiction of FIGS. 2, 10, 10A and 25-26 depict a single trolley beam 33 which engages two pulling arms 9P which pull the movable arms 9B from two different stationary arms 9A oppositely positioned from one another. The same deploying drive mechanism 13 may also be used for those movable arms 9B upon the opposite side of the stationary arms 9A utilizing the rope loop 39 to pull pulling canopy section 11S together. A track housing beam 33 positioned on the opposite side may be similarly equipped to perform the same function. Likewise the connective eyelet linkage 39 may be unhooked from rope loop 40A and reestablished on the opposite side of the stationary arms 9A for deployment to the open arm 9 position. It should also be observed that the deployment mechanism 13 may be easily pivoted to the transport position when retracting movable arms 9B via drive arms 9P onto the stationary arms 9A. A series of cable guides or pulleys may be effectively utilized to operationally conduct cable 38 from winch 29 to its connective link with the wheeled trolley eyelet 37A as shown in FIGS. 10 and 10A.

Device 1 Upper arm mount 24U
Wheeled vehicle 3 Lower arm mount 24L
Deploying unit 7 Closure stops 24S & 25S
Movable arm 9B Hinging columns 24C & 25C
Stationary arm 9A Looped rope 40A
Arm 9A Winches 29
Retaining member 15 Boom assembly 13B
Canopy 11 Tracked boom beam 33
Canopy sections IIS Truss brace 32
Drive arm 9P Tracking rollers 37
Outrigging attachment 8 Mounting base 35A
Drive mechanism 13 Cylindrical member 35
Frame 5 Rope Loop 39
Extending structure 4 Bolt 36
Mounting plate 50 Track 33A

Clips 44 Cable/rope 38
Bracketing eyelets 43 Cable retainer 37A
Cylindrical hub 12 Arm section eyelets 44A
Outrigging braces 8A & 8B Cable tension member 45
Hinge mount 16B Terminating clips 44A
Hinging pins/boll 16 Rope sections 42S
Vertical arm brace 17 Pivotal mount 8T
Arm truss brace 18 Vertical braces 13V
Nuts 16A Bridging eyelet 43
Wheel and axle assembly 6 Half sections plates 10H, 102H, 103H & 14H
Tow-bar 6T
Pivotal mount 8P
Latch 8M
Outrigging foot 8F
Set pins 8S
Base frame 5A
Retracting wheel 6W
Canopy draw ropes 42
Eyelet fitting 41
Receiving aperture 20A
Supporting plates 10, 102, 103, 14 & 15
Housing 28H
Bolt aperture 30E
Spacing washers/plates SW
Main arm beam 19
Protruding lips 14L & 103L
Partial plate sections 24&25
Hinging columns 24C
Half plate section 7H
Gusset plate 22
Bushing 23

What is claimed is:

1. A portable protective outdoor shielding device for protective shielding of animals, said device consisting essentially:
   A) a supportive frame adapted for wheeled transport;
   B) at least one vertical extending member supported by said frame;
   C) an arm deploying unit elevationally positioned upon the vertical member to permit the protective shielding of animals with said arm deploying unit comprising a mounting plate equipped with pivotal arm mounts and retaining members for retaining the device at a closed position for the wheeled transport and at an open position for the protective shielding of animals;
   D) a plurality of pivotally mounted arms individually mounted to the pivotal arm mounts so as to permit the pivotally mounted arms to radially fan about said arm deploying unit when the pivotally mounted arms are placed at the open position and when the arm deploying unit is placed at the closed position to longitudinally align the pivotal mounted arms in alignment with the wheeled transport;
   E) at least one canopy supportive stationary arm positionally mounted to the mounting plate in the alignment with the wheeled transport so as to permit deployment of the pivotally mounted arms to the open position and a retraction of the pivotally mounted arms thereto when the pivotally mounted arms are placed at the closed position, and
   F) a sectionalized canopy having canopy sections supported by the pivotally mounted arms so as to permit the canopy sections to radially move about the arm deploying unit to the closed position and radially move about the arm deploying unit to the open position and thereby provide the protective shielding of animals sheltered thereunder.

2. The device according to claim 1 wherein the canopy comprises a dark colored canopy having a sufficient porous structure to allow heated air currents occluded beneath the canopy to flow upwardly therethrough while also shielding the animals from sun rays.

3. The device according to claim 2 wherein the deploying unit is elevated by upon said vertical extending member at a sufficient elevational height to permit a desired animal to be shielded beneath the canopy.

4. The device according to claim 3 wherein the elevational height of the arm deploying unit is at least six feet above ground level.

5. The device according to claim 3 wherein the arm deploying unit comprises a half section deploying plate mounted atop the vertical extending member, with said half section deploying plate having a stationary arm and a number of the pivotally mounted arms mounted thereto deployable to the open position and retractable to the closed position and a pair of hinged arm retaining quarter section plates hingeable mounted to the half section deploying plate, with said pair of quarter section plates having mounted thereto a series of the pivotally mounted arms deployable to the open position when said pair of the hinged quarter sections plates are radially drawn together in combination with the half section deploying plate to form a deploying arc and when the said pair of quarter section plates are radially drawn apart to permit an alignment of the pivotally mounted arms to the closed position.

6. The device according to claim 2 wherein the arms are at least ten feet in length and radially extend outwardly from the vertical extending member to radially provide a substantially unobstructed open space so as to permit the convection flow of the heated air currents through the porous structure of the canopy.

7. The device according to claim 6 wherein the device includes a wheeled carriage with wheels aligned in longitudinal alignment with the pivotally mounted arms when the arms are placed at in the closed position.

8. The device according to claim 1 wherein the area beneath the canopy has sufficient openness to permit a convection flow of the heated air currents and the canopy is substantially dark in color of a sufficient porous structure so as to absorb heat and permit the convection flow of the heated air currents occluded beneath the canopy to flow therethrough, and the canopy comprises at least two separated canopy sections mounted upon said pivotally mounted arms so as to permit the canopy sections to separately move to the open position and the closed position.

9. The device according to claim 1 wherein the arms have a longitudinal length of at least 10 feet, the canopy includes at least four separate canopy sections comprised of at least two rearward canopy sections retracting to a rearward position when the pivotally mounted arms supportive of the rearward canopy sections are retracted to the closed position and at least two forward canopy sections retracting to a forward position when the pivotally mounted arms supportive of the forward sections are placed in the closed position, the deploying unit includes two stationary arms oppositely mounted to the mounting plate with each of said separate canopy sections being supportively retained by said stationary arms so as to permit pivotally mounted arms driven by drive arms thereof serving to draw each of said canopy sections to the open position and retract the canopy sections to the closed position and the retaining members comprise a multiplicity of stops which individually serve to retain each of the pivotally mounted arms at a predetermined radial positioning, and the stationary arms and the pivotally mounted arms are elevationally positioned as with at least seven feet of ground clearance.

10. The device according to claim 1 wherein the retaining members comprise a cable equipped with radially positioned stops for stopping the pivotally mounted arms at a predetermined open radial position when the canopy is placed at in the open position and stops for retaining the pivotally mounted arms at the closed position for the wheeled transport.

11. The device according to claim 1 wherein the arm mounting plate comprises a multiple split plate arm mounting sections having a pair of hinged arm retaining plate sections hinged to a stationary main arm deploying plate section mounted to the vertical support, with the pair of hinged arm retaining plate sections allowing the pivotally mounted arms carried by the pair of hinged arm retaining plate sections and the main arm plate deploying section to be longitudinally positioned on one side of the deploying unit at the closed position when the pair are radially drawn apart from one another and when the pair of hinged arm retaining plate sections are radially drawn together to permit a positioning of the pivotally mounted arms at the open position.

12. The device according to claim 11 wherein the device includes the wheeled transport and the deploying unit includes a single stationary arm longitudinally aligned in the direction of the wheeled transport and positioned at one side of the arm deploying unit so as to post all of the pivotally mounted arms in alignment with the direction of the wheeled transport when the pivotally mounted arms are placed at the closed position.

13. The device according to claim 11 wherein the arm deploying unit includes one stationary radially extending arm positioned in longitudinal alignment to the direction of the wheeled transport, the canopy includes at least one radial canopy separation separating the canopy into canopy sections so as permit separable movement of the canopy sections, the arm deploying unit includes at least two drive arms equipped to retract the pivotally mounted arms and the canopy sections supported thereby onto longitudinally alignment with the stationary arm to the closed position and to deploy the pivotally mounted arms from the stationary arm to the open position and the retaining members includes open retaining stops carried by a cable circumscribing the multiple split arm mounting sections for retaining each of the pivotally mounted arms at a predetermined radial open position when the canopy sections are placed at the open position.

14. The device according to claim 1 wherein the arm deploying unit comprises a main arm mounting plate mounted to the vertical support member at a desired elevational level for the protective shielding of animals, with said main arm mounting plate having a multiplicity of the pivotally mounted arms and a single stationary arm mounted thereto, a first hinged arm mounting plate serving to mount a series of the pivotally mounted arms thereto and a second hinged arm mounting plate serving as a mount for another series of the pivotally mounted arms with said first hinged arm plate and said second hinged arm plate being oppositely hinged to the main arm mounting plate so as to collectively form a deploying arc and permit the pivotally mounted arms to be radially deployed to the open position and when the first hinged arm mounting plate and the second hinged arm mounting plate are radially drawn apart to permit an alignment of the pivotally mounted arms to the closed position.

15. A method of providing protective shielding to animals in an outdoor environment, said method comprising:
  A) providing a portable outdoor protective shielding device consisting essentially of:
    a) a supportive frame adapted for wheeled transport;
    b) at least one vertical extending member supported by said frame
    c) an arm deploying unit elevationally positioned upon the vertical member to permit the protective shielding of animals with said arm deploying unit comprising a mounting plate equipped with pivotal arm mounts and retaining members for retaining the device at a closed position for the wheeled transport and at an open position for the protective shielding of animals;
    d) a plurality of pivotally mounted arms individually mounted to the pivotal arm mounts so as to permit the pivotally mounted arms to radially fan about said arm deploying unit when the pivotally mounted arms are placed at the open position and when the arm deploying unit is placed at the closed position to longitudinally align the pivotally mounted arms in alignment with the wheeled transport and;
    e) at least one canopy supportive stationary arm positionally mounted to the mounting plate in the alignment with the wheeled transport so as to permit deployment of the pivotally mounted arms to the open position and a retraction of the pivotally mounted arms thereto when the pivotally mounted arms are placed at the closed position, and
    f) a sectionalized canopy having canopy sections supported by the pivotally mounted arms so as to permit the canopy sections to radially move about the arm deploying unit to the closed position and radially move about the arm deploying unit to the open position and thereby provide the protective shielding of animals sheltered thereunder;
  B) placing the device with the pivotal mounted arms in the closed position at a desired outdoor site; and
  C) deploying the pivotally mounted arms to the open position so as to provide the protective shielding of animals thereunder at the outdoor site.

16. The method according to claim 15 wherein canopy comprises a dark perforated sun shielding canopy supported by the pivotally mounted arms which positioned at least six feet above ground level; and the method includes the deploying the pivotal mounted arms to the open position at a grazing site, subsequently retracting the canopy to the closed position, transporting the device to a different animal grazing site and redeploying the pivotally mounted arms to the open position and thereby provide the protective shielding of animals at a different animal grazing site.

17. The method according to claim 16 wherein the device includes a wheeled undercarriage for transporting the device, the canopy contains at least two canopy sections deployable in opposite radial directions, the arm deploying unit is mounted atop of the vertically extending member at an elevation of at least seven feet above ground level, the pivotally mounted arms have a radial length of at least ten feet, the canopy sections comprise of a perforated dark colored sun shielding canopy having a sufficient number of uniformly dispersed apertures therewithin so as to allow a convection of heated air currents generated beneath the canopy to escape through said apertures, the deploying unit includes the mounting plate having at least one stationary arm mounted to the mounting plate in longitudinal alignment with the pivotally mounted arms at the closed position and at least two movable drive arms which serve to draw the pivotally mounted arms to the open position and to post the pivotally mounted arms onto the at least one stationary arm at the closed position wherein the retaining members for retaining the pivotally mounted arms in the open position comprise open retaining stops positioned along a cable interconnecting the pivotal mounted arms at the predetermined open radial position for each of the pivotal mounted arms and the method includes drawing the pivotally mounted arms to the open position with said drive arms.

18. The method according to claim 16 wherein the method includes transporting the device at the closed position with a motorized vehicle upon a paved roadway.

19. The method according to claim 15 wherein the wheeled undercarriage provides sufficient clearance to permit transport along rowed crops while shielding horticultural workers by said device and the method includes the transport of the device to a desired horticulture site, deploying the device to the open position while shield the workers cropping along the rowed crops with the device and retracting the arms to a closed position for transporting the device to another horticulture site.

20. The method according to claim 15 wherein the mounting plate comprises a half section arm deploying plate mounted to the vertical extending member at a sufficient elevational height to provide the protective shielding of animals, with said half section plate being equipped with a plurality of arm mounting mounts serving to mount a stationary arm and a number of pivotally mounted arms individually mounted to the arm mounting mounts and a pair of hinged arm retaining quarter sections plates hingeable mounted to the half section plate with said pair having mounted thereto a plurality of the pivotally mounted arms deployable to the open position when said hinged quarter sections plates are radially drawn together to provide a deploying arc and when the pair of hinged quarter section plates are radially drawn apart to allow the pivotally mounted arms to be retracted to the closed position in the longitudinal alignment with the wheeled transport, and wherein the method includes withdrawing the pivotally mounted arms to a closed position, transporting the device upon a paved highway to a different outdoor site, deploying the pivotally mounted arms to the open position to shield animals at the different site.

21. A method of providing protective shielding of animals in an outdoor environment, said method comprising:
A) providing a portable outdoor protective shielding device comprised of:
   a) a supportive frame having an undercarriage for wheeled transport;
   b) an arm deploying unit elevationally positioned to permit a desired animal to be shielded by said device with said the deploying unit including retaining stops for retaining the arms at a closed position and open retaining stops for retaining the pivotally mounted arms at an open position;
   c) a plurality of arms of at least 16 feet in length equipped with supportive bracing to maintain the arms in a horizontal position with said arms being radially movable about the arm deploying unit at an elevation of at least seven feet above ground level and radially fanning about said arm deploying unit when said arms are placed at the open position and when the arm deploying unit is placed at the closed position to longitudinally align the arms in direction of the wheeled transport;
   d) a sectionalized canopy separating the canopy into canopy sections supported and deployed by said arms which canopy sections permit the arms supportive of said canopy to radially move about the arm deploying unit to the closed position for transport by the wheeled transport and radially move the arm deploying unit to the open position so as to provide the protective shielding of animals sheltered by the canopy sections at the open position, with said canopy sections having a partially open structure containing a sufficient number of uniformly dispersed apertures to allow heated air currents occluded beneath the canopy sections to flow upwardly therethrough and a sufficiently dark structure to protectively shield the animal from sun rays;
B) placing the device at a desired outdoor site;
C) deploying and retaining the movable arms at the open position with the open retaining stops;
D) retracting and retaining the arms with said retracting stops at the closed position;
E) transporting the device to a different shielding site; and
F) redeploying the arms and the canopy sections to the open position to provide the protective shielding of animals at a different site.

22. The method according to claim 21 wherein the method includes placing the arm deploying unit in the open position at an outdoor cattle grazing site while allowing grazing cattle to be protectively shielded from sun rays and excessive heat exposure by said device.

* * * * *